(12) United States Patent
Roberts et al.

(10) Patent No.: US 10,170,013 B1
(45) Date of Patent: Jan. 1, 2019

(54) ASSESSMENT INSTANCES IN COMPUTERIZED ASSESSMENTS

(75) Inventors: Paul Roberts, Carmarthen (GB); John Kleeman, London (GB); Eric Shepherd, Miami Beach, FL (US)

(73) Assignee: Questionmark Computing Limited, London (GB)

( * ) Notice: Subject to any disclaimer, the term of this patent is extended or adjusted under 35 U.S.C. 154(b) by 2540 days.

(21) Appl. No.: 12/013,308

(22) Filed: Jan. 11, 2008

Related U.S. Application Data

(60) Provisional application No. 60/884,736, filed on Jan. 12, 2007.

(51) Int. Cl.
G09B 7/00 (2006.01)

(52) U.S. Cl.
CPC ...................... G09B 7/00 (2013.01)

(58) Field of Classification Search
CPC ........................................................ G09B 7/00
USPC .................... 463/23, 40, 42; 705/26, 37, 51
See application file for complete search history.

(56) References Cited

U.S. PATENT DOCUMENTS

| | | | |
|---|---|---|---|
| 6,419,232 B1 * | 7/2002 | Sturdevant, II | 273/430 |
| 6,855,057 B2 * | 2/2005 | Namba et al. | 463/42 |
| 2001/0003099 A1 * | 6/2001 | Von Kohorn | 463/40 |
| 2001/0027130 A1 * | 10/2001 | Namba et al. | 463/42 |
| 2001/0056396 A1 * | 12/2001 | Goino | 705/37 |
| 2002/0155419 A1 * | 10/2002 | Banerjee | G09B 7/00 434/322 |
| 2003/0061231 A1 * | 3/2003 | Lovegren | G06Q 10/10 |
| 2003/0224339 A1 * | 12/2003 | Jain | G09B 7/00 434/350 |
| 2004/0013398 A1 * | 1/2004 | Miura et al. | 386/46 |
| 2004/0230825 A1 | 11/2004 | Shepherd | |
| 2004/0259062 A1 * | 12/2004 | Heller | G09B 7/077 434/236 |
| 2006/0046239 A1 * | 3/2006 | Allen | G09B 25/00 434/353 |
| 2006/0259922 A1 * | 11/2006 | Sandgren | H04N 21/4758 725/13 |

(Continued)

Primary Examiner — James S McClellan
Assistant Examiner — Kevin Carter
(74) Attorney, Agent, or Firm — Brian J. Colandreo; Michael T. Abramson; Holland & Knight LLP

(57) ABSTRACT

Computerized assessments rely upon databases containing constantly changing assessment information including an identifier, questions, choices, and scoring criteria. A particular instance of an assessment, including captured questions and corresponding scoring criteria is stored. The captured questions are administered to assessment takers. The answers are linked to scoring criteria using the identifier, so that assessment results may be generated. The assessment instance includes a first data entity including a selection of questions and an instance identifier; and a second data entity including the instance identifier and scoring criteria. An API captures the assessment instance responsive to a request by an external program, then communicates the first data entity to the external program. The external program then communicates back assessment answers with the identifier. The API associates the responses with the second data entity using the identifier and creates scoring results. The scoring results are then be stored and/or communicated externally.

23 Claims, 10 Drawing Sheets

(56) References Cited

U.S. PATENT DOCUMENTS

| | | | |
|---|---|---|---|
| 2006/0294552 A1* | 12/2006 | Swanson | G06Q 30/02 |
| | | | 725/80 |
| 2008/0027995 A1* | 1/2008 | Beigel | G06Q 10/06 |
| 2008/0046317 A1* | 2/2008 | Christianson | G06Q 30/02 |
| | | | 705/14.44 |
| 2008/0261680 A1* | 10/2008 | Buecheler et al. | 463/23 |
| 2009/0119187 A1* | 5/2009 | Goino | 705/26 |

* cited by examiner

ASSESSMENT INSTANCES IN COMPUTERIZED ASSESSMENTS

RELATED APPLICATIONS

The present application claims benefit of priority under 35 U.S.C. § 119 of U.S. Provisional Patent Application No. 60/884,736, the entirety of which is expressly incorporated herein by reference.

BACKGROUND OF THE INVENTION

1. Field of the Invention

This invention relates to the field of computerized assessments of individual knowledge or opinion.

2. Related Art

U.S. patent application Ser. No. 10/791,019 filed Mar. 2, 2004, which is incorporated herein by reference, reveals a secure server suitable for administering computerized. FIG. 1A shows a schematic of such a system. The server 102 maintains at least one database 104 in at least one memory device. Information in the database may include:
- questions to be asked of assessment takers,
- correct and incorrect choices for those questions,
- scoring criteria relating to questions,
- identifying information about individuals using the system including administrators and assessment takers,
- individual responses to questions,
- group responses to questions; and
- formatting information relating to display of questions and responses.

The server 102 communicates via a network 106 with user equipment 108. The server and user equipment may be of any suitable type, including desktop and laptop PCs. The database or databases may also be of any suitable type. The network may also be of any suitable type including wired, wireless, LAN, and/or the Internet. There may be more than one server and/or network. There may be an arbitrary number of users.

As discussed in the prior application, security is implemented to ensure integrity of assessment responses.

SUMMARY OF THE INVENTION

The database is amenable to constant update as questions, answers and scoring criteria are added, amended and deleted. When an assessment is created, typically only a subset of questions will be used. Selection of a subset of questions allows multiple assessments to be created from the same data and allows for manageable size tests.

A problem that arises in delivering assessments from a dynamic database, when results are not returned immediately, is the determination of what questions, answers, and scoring criteria were actually used for obtaining those results, including when questions or question contents are selected at random.

It would be desirable to capture an instance of an assessment as administered or as intended for administration ("assessment instance"), so that the meaning of later results can be better understood.

It is therefore an object to provide a medium readable by a data processing device and embodying program code for causing the data processing device to perform operations, the operations comprising: capturing and storing at least one assessment instance from at least one assessment database, the database comprising changing versions of a plurality of assessment questions and a plurality of scoring criteria related to the questions, which assessment instance comprises: a captured version of at least some of the questions; and scoring criteria associated with the captured questions.

It is a further object to provide a system comprising: at least one storage medium for embodying data; at least one data processing device adapted to perform operations comprising: maintaining at least one assessment database, the database comprising changing versions of a plurality of assessment questions and a plurality of scoring criteria related to the questions; capturing and storing an assessment instance, which assessment instance comprises: a captured version representing at least some of the questions; and scoring criteria associated with the captured questions; and delivering the captured questions from the assessment instance in a format suitable for administration to at least one assessment taker.

It is a still further object to provide a method for administering an assessment comprising: first transmitting an assessment request to at least one digital data processing device, the device being associated with at least one database of changeable assessment information, the assessment information comprising changeable versions of questions and associated scoring criteria and being aggregated into an assessment instance; first receiving an assessment instance, the assessment instance comprising a captured version of at least some of the questions from the database and an identifier of the assessment instance identifying the versions of the questions received; presenting the assessment instance to at least one assessment taker; second receiving assessment responses from the assessment taker to the assessment instance; and recording the received second transmitting the assessment responses in conjunction with an identification of the changeable assessment information to the device along with the identifier in order to permit scoring of the assessment responses based on a captured version of the scoring criteria associated with the assessment instance.

It is another object to provide a method for administering an assessment comprising: first transmitting an assessment request to at least one digital data processing device, the device being associated with at least one database of changeable assessment information, the assessment information comprising changeable versions of questions and associated scoring criteria; presenting the an assessment instance comprising a plurality of questions to at least one assessment taker; second receiving assessment responses from the assessment taker to the assessment instance; and recording the received second transmitting the assessment responses in conjunction with the changeable assessment information to the device along with the identifier in order to permit scoring of the assessment responses based on a captured version of the scoring criteria associated with the assessment instance.

Another object provides a method of taking an assessment, the method comprising: receiving an assessment instance via at least one assessment delivery medium, the assessment instance comprising a captured version of questions from a database and an identifier of the assessment instance, the database being embodied on a storage medium associated with at least one data processing device, the device maintaining a changeable set of assessment questions and scoring criteria in the database; and providing assessment responses via at least one assessment response medium in association with the identifier, and thus provoking generation of an assessment score, responsive to the assessment responses and the identifier using scoring criteria associated with the captured version of the questions.

A further object provides a medium readable by a data processing device and embodying program code for causing the data processing device to perform operations, the operations comprising capturing and storing at least one assessment instance derived from at least one assessment database, the at least one database comprising dynamic content for generating a plurality of assessment questions, and a plurality of respective scoring criteria related to the assessment questions, said assessment instance comprising a static representation of at least a portion of the questions of the at least one assessment, wherein the respective scoring criteria for the plurality of assessment questions are preserved.

In accordance with the main objects, the operations may further comprise delivering the captured questions from the assessment instance in a format suitable for administration to at least one assessment taker. Likewise, the operations may further comprise receiving assessment instance specifications from a user and/or from a computer program. The captured assessment instance may be stored in a medium independent format. The medium independent format may comprise a first data entity comprising the captured questions; and a second data entity comprising the captured scoring criteria, the second data entity being linked with the first data entity by an identifier; and delivering the assessment instance may comprise delivering the identifier. The operations may further comprise: capturing assessment responses from an assessment taker; associating the captured responses with the second data entity using the identifier; scoring the responses based on the second data entity to yield assessment results; and delivering and/or storing the assessment results.

The format that is independent of the medium may be, for example, a markup language, such as XML (eXtensible Markup Language).

The program code may be adapted to run as at least one API. The program code may be configured to cause the at least one processor to run at least two processes, the processes comprising: at least one API for creating assessment instances and scoring responses; and at least one external program for requesting the API to create and deliver the assessment instance, providing assessment responses to the API, and receiving a scoring response from the API.

The program code may be divided into at least two processes, a first process for creating an assessment instance, responsive to at least one external program; and a second process for scoring responses from the assessment instance, responsive to at least one external program.

The assessment instance may include a representation of a type of at least a particular one of the captured questions. The operations may further comprise validating assessment responses relating to the particular one against the type representation. The type representation may include a representation of a range of possible responses. The capturing of the assessment instance may comprise a randomization operation relating to selection of the questions. The captured questions may comprise a selection of a randomized subset of the questions in the database. The randomization operation may comprise imposing a random order on the captured questions and/or selecting a subset of question from a topic or sub-topic and/or choosing random questions, constrained by type of question, where the type of question is adapted to a delivery medium expected to deliver the assessment instance to an assessment taker. The capturing of the assessment instance may comprise resolving a parameterized question into an administrable format. The database may comprise changing versions of choices to the questions and the assessment instance comprises a captured version of the choices corresponding to the captured version of the questions. The capturing operation may comprise shuffling an order of the choices before creating the assessment instance and/or a randomization operation relating to a selection of choices within a question.

The operations further comprise: capturing a plurality of assessment instances; and/or capturing a plurality of assessment responses from a plurality of assessment takers; and/or storing the captured responses so that each captured response is associated with an appropriate one of the captured assessment instances. The captured assessment instance may be administered to a group of assessment takers; and the operations may further comprise: capturing a plurality of assessment responses from the group; scoring the responses to yield scoring results; and/or storing and/or delivering the scoring results, so that at least some scoring results are group results, rather than individual results. The operations may further comprise determining that the assessment instance is no longer useful; and sunsetting the assessment instance. The operations further comprise: receiving a request for the assessment instance from an assessment administrator; transmitting a summary of the assessment instance to the assessment administrator; receiving a confirmation that the assessment instance is appropriate from the assessment administrator; and transmitting the assessment instance to the assessment instance responsive to the confirmation. The operations may further comprise: receiving a request for the assessment instance from an assessment administrator; transmitting a first summary of the assessment instance to the assessment administrator; receiving a rejection from the assessment administrator; and responsive to the rejection, transmitting a new summary of a new assessment instance to the assessment administrator. The operations may further comprise: storing a plurality of distinct assessment instances; storing a set of assessment responses associated with at least one of the distinct assessment instances; generating and storing a group and individual results relating to the set; and providing statistical analyses relating to the group results.

The method may further comprise: delivering first and second distinct assessment instances via first and second distinct delivery media; and providing comparison of results derived from responses received responsive to the first and second assessment instances. The assessment instance may be stored in a format that is independent of the medium; and the system may further comprise at least one delivery medium interface module adapted to create the form suitable for administration, responsive to the format that is independent of the medium. The format that is independent of the medium may comprise a first data entity comprising the captured questions; and a second data entity comprising the captured scoring criteria, the second data entity being linked with the first data entity by an identifier; the method may further comprise delivering the assessment instance comprises delivering first data entity and the identifier; and the operations may further comprise: capturing assessment responses from the assessment taker; associating the captured responses with the second data entity using the identifier; scoring the captured responses, responsive to the second data entity, to yield assessment results; and delivering and/or storing the assessment results.

The assessment instance may comprise first and second subsets, the first subset being suitable for delivery by a first delivery medium, and the second subset being suitable for delivery by a second delivery medium, at least one captured question being present in one subset but not the other. The at least one delivery medium interface module may comprise first and second delivery medium interface modules corresponding to the first and second delivery media, respectively. The delivering operation may comprise delivering the first and second subsets to the first and second delivery media via the first and second delivery medium interface modules, respectively. The system may comprise a plurality of delivery medium interface modules, each module corresponding with a respective distinct delivery medium. The form suitable for administration may be voice and the system may further comprise at least one means adapted to deliver the assessment instance in the form of speech. The form suitable for administration may be crowd oriented and the system may further comprise at least one means adapted to deliver the assessment instance in a crowd oriented form. The assessment may be delivered through a screen.

The program code may be configured to cause the processor to provide at least one API including at least: a first process for generating, storing, and transmitting the assessment instance responsive to an external program; and a second process for scoring responses received from the external program and for storing and transmitting assessment results. The API may be exposed through the Internet. The external program may be configured to interact with at least one assessment delivery medium. The delivery medium may comprise, for example, paper. The system may comprise a plurality of delivery devices of distinct types, each configured to deliver at least one respective version of the assessment instance. A plurality of reception devices of distinct types may be provided, each configured to receive at least one respective set of responses relating to the assessment instance. At least one communication facility coupled to interact with the delivery and reception devices may be provided, so that all the sets of responses are scored in the same manner. The delivery devices may comprise at least one computer. The delivery devices may comprise a screen visible to an audience and/or a printer, and/or a microphone, and/or a motion detector and/or a camera and/or a scanner. A telephone may be used to act as both a reception and delivery device.

The desired delivery medium may comprise speech and/or visual data, and oriented to an individual or a crowd, e.g., a plurality of individuals. The presenting may comprise first and second presenting of the assessment instance to at least first and second assessment takers in accordance with first and second distinct delivery media, respectively.

The assessment instance may be received in a format that is independent of delivery medium. At least one desired delivery medium may be used to present to the assessment taker a converted version of the assessment instance.

The receiving of the assessment responses from the assessment taker may employ a response medium. The operations may further comprise provoking a transformation of the assessment responses into a medium independent format for use by the device.

The response medium may be the same as, or distinct from, the delivery medium. The response medium may be, for example, speech, a visual presentation, a group presentation, and/or crowd oriented. The assessment may be presented to a plurality of assessment takers.

The first and second assessment responses may be received from at least first and second assessment takers in accordance with at least first and second distinct response media, respectively. The operations may further comprise receiving a summary of the assessment instance. The operations may further comprise: requesting a new assessment instance responsive to the summary; receiving the new assessment instance; and using the new assessment instance for the presenting. The assessment instance may comprise first and second subsets, the first subset being suitable for delivery by a first delivery medium, and the second subset being suitable for delivery by a second delivery medium, at least one captured question being present in one subset but not the other. The presenting may comprise delivering the first and second subsets in accordance with the first and second delivery media, respectively. The assessment delivery medium may be the same as, or distinct from, the assessment response medium.

Other objects and advantages of the invention will be apparent in the following.

BRIEF DESCRIPTION OF THE DRAWINGS

The invention will now be described by way of non-limiting example with reference to the following figures.

DETAILED DESCRIPTION OF THE PREFERRED EMBODIMENTS

Definitions

The term "assessment" as used herein may include exams, tests, quizzes, and surveys.

For the purposes of this application the term "scoring criteria" is any objective framework for analyzing a response to a question. In the case of a test, the scoring criteria would relate to whether an answer is correct or not. In the case of a survey, the scoring criteria might relate to subjective characteristics of the assessment taker. Scoring criteria can be binary (true/false), numeric, or non-parametric.

The terms "response" and "answer" are used interchangeably herein.

Figure 1A:
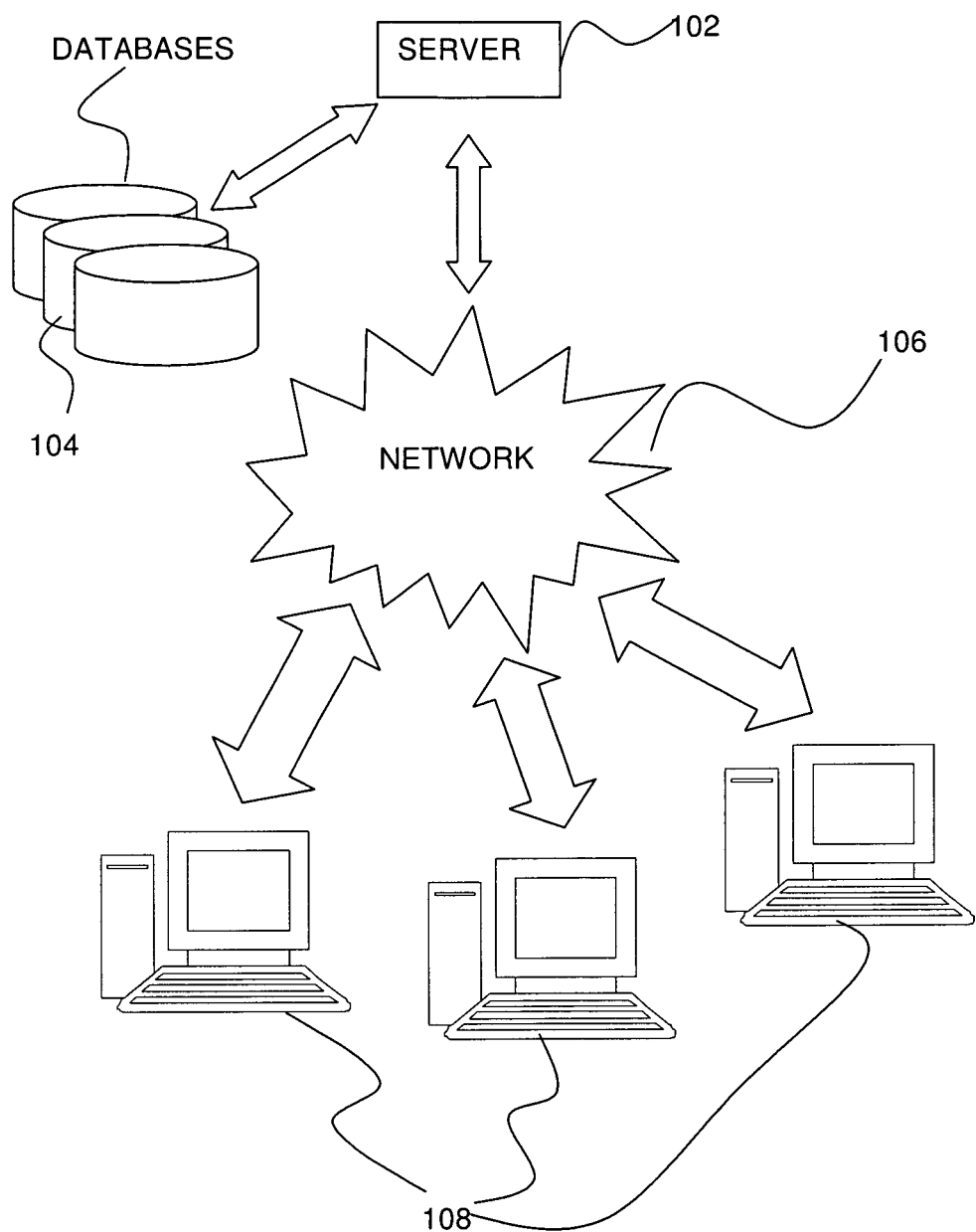
FIG. 1A shows a schematic of a system for delivering assessments and results.
Figure 1B:
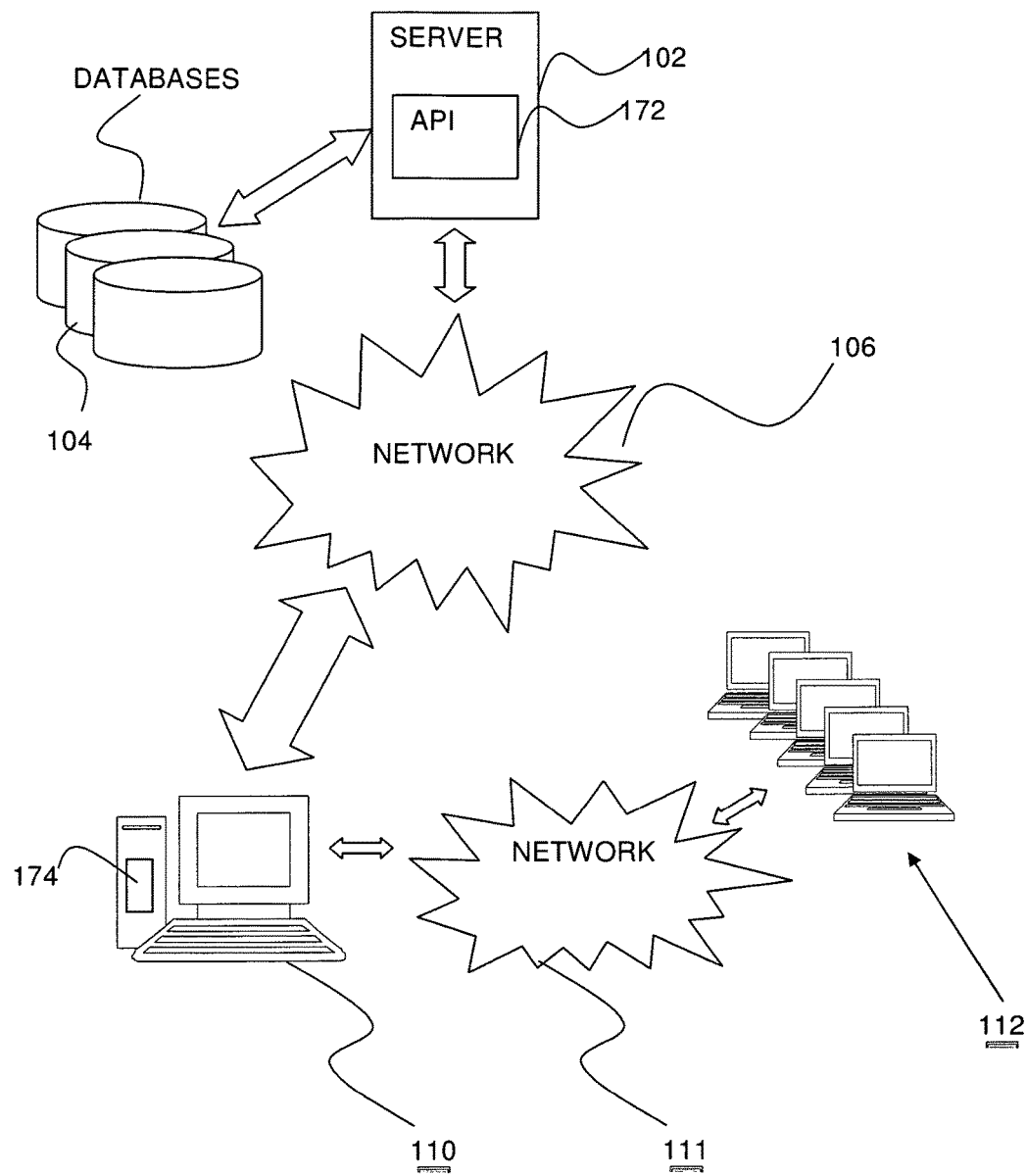
FIG. 1B shows an additional schematic of a system for delivering assessments.

FIG. 1B shows an additional schematic of a system for delivering computerized assessments. In this system, the server 102 communicates with a workstation 110 of an assessment administrator via network 106, while the workstation 110 communicates via a second network 111, possibly wirelessly, with user stations 112. While standard TCP-IP over Ethernet or similar networks is generally preferred, the use of other physical and logical network implementations and protocols is possible. For example, a test-taking terminal may be a "smart" cellular telephone or device which communicates through a cellular data infrastructure. The workstations 112 may also communicate with users in the form of speech and employ speech recognition as an input. Various voice communication standards, such as VoiceXML may be employed to implement the user interface. In this system, responses might be delivered via the networks 106 and 111 to either the administrator workstation 110 or the user workstations 112. An Application Program Interface (API) 172 resides on the server 102. Software 174 on the system 110 interacts with the API 172.

Responses might equally well be transmitted via some other medium, such as paper and conventional mail. While typically it is desired that the test-taking conditions be standardized for all persons subjected to the assessment, in some cases, the assessment may be administered in a multimodal fashion, permitting various test-takers to be assessed through a variety of means, depending on the circumstances of the test delivery or the test-taker. In other cases, a single assessment for a test-taker may be multimodal, for example employing voice, writing, images, video, and the like. Such multimodal assessments may be particularly useful in language assessment or other kinds of performance testing. Different modalities may be better adapted to assessment takers with special needs. For instance, vision impaired test takers may do better with speech based assessment. In such cases, preferably the same assessment can be delivered to the special needs assessment taker as to normal test takers, albeit in different forms. Then the responses should be reported back to the server in the same format, so that the media of administration need not be apparent in the results.

By administering multimodal assessments within the same series to a single user, it is possible to validate the assessment and components thereof. Thus, even where a single mode of assessment is sufficient, it may be desirable to administer a multimodal assessment in order to validate and normalize or perform other statistical analysis of components from the various modes.

The choice of modality may be made as part of the assessment administration, test-taker preferences, hardware limitations, or the like. Where the administration parameters are not predefined as part of the assessment, the conditions of assessment in each case are preferably recorded and stored with the assessment record.

Like numbered elements of FIG. 1B are the same as the similarly numbered elements in FIG. 1A.

It is expected that server 102 will maintain the databases 104, dynamically, so that information relating to assessments may be constantly changed. Questions, choices, and scoring criteria may be added, amended or deleted.

Server 102 may be any suitable type of computer such as a PC. The databases 104 may be stored on any suitable type of memory device such as a hard drive, optical disk drive, or other mass storage device. Connections shown may be wired or wireless.

Figure 1C:
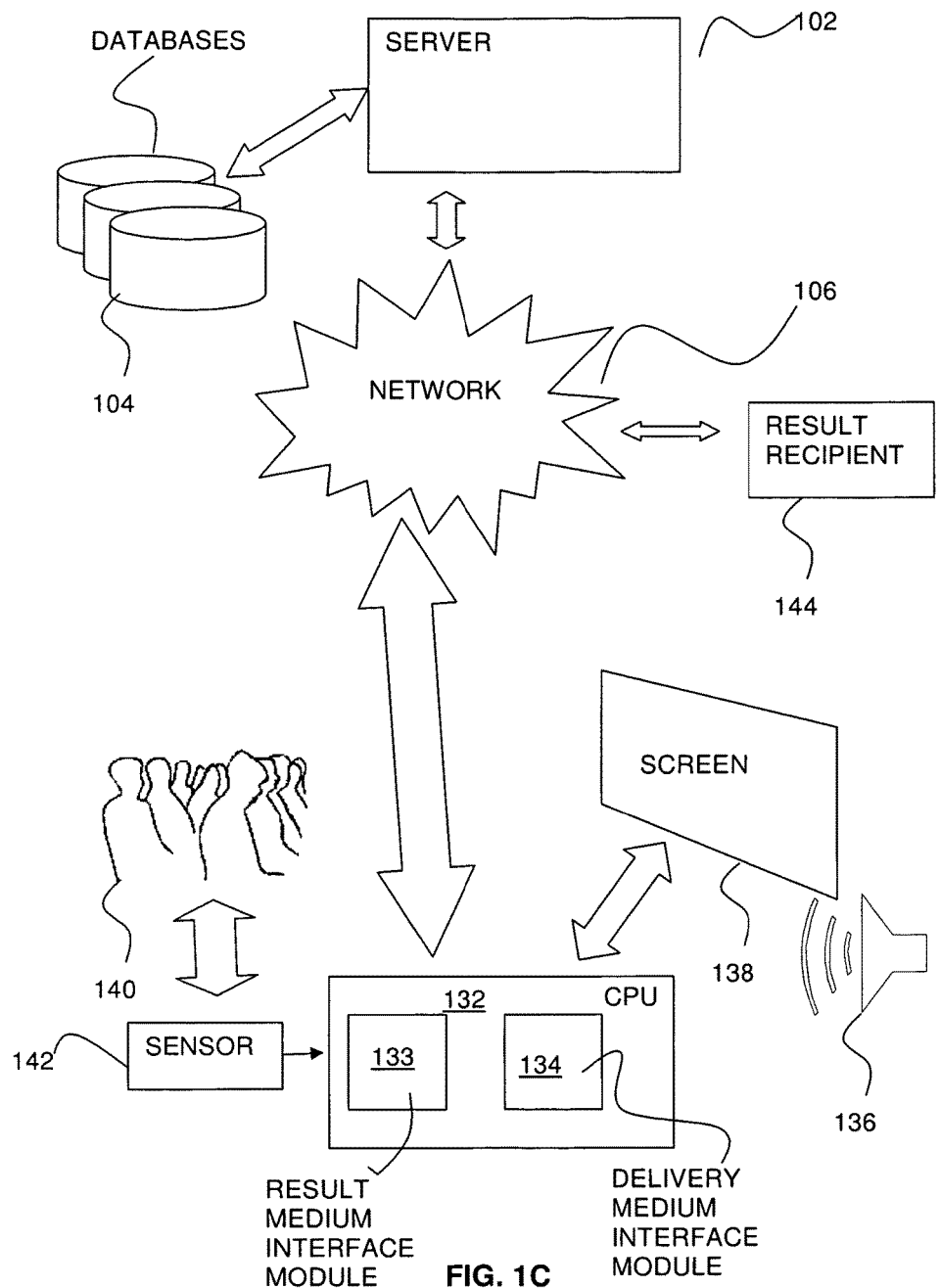
FIG. 1C shows a third schematic of a system for delivering assessments

FIG. 1C shows yet another schematic of a system for delivering computerized assessments. This embodiment is crowd-oriented. In this case information from the server 102 is transmitted to at least one processor 132 in a medium-independent form such as the eXtensible Markup Language (XML), or some other markup language or assessment-defining communication. The processor 132 implements a delivery interface module 134 for supplying an assessment instance to a crowd-oriented delivery medium or media such as screen 138 and loudspeaker 136. The assessment instance may, for instance, be presented in PowerPoint. From the crowd-oriented delivery medium, an audience 140 can experience the assessment instance. The audience 140 may then provide a crowd-oriented answer, such as calling out, raising hands. If each member of the crowd has a keypad in the arm of his or her chair, inputs to those keypads may be interpreted either as individual or group responses. A crowd-oriented response may be sensed by a sensor 142, which communicates with a response medium interface module 133. The sensor 142 might include a microphone, e.g., together with speech detection software; a motion detector and/or a camera for sensing crowd behavior; or circuitry for detecting keypad inputs. The module 133 converts the answer to a medium independent format, such as XML (optionally with a referenced or embedded binary object), which is then communicated back to the server 102 for scoring. Alternately, the raw data may be communicated remotely for interpretation and transformation into a discrete "answer". The server 102 will then provide scoring information in whatever format is desired, possibly to the audience 140 or possibly to a distinct result recipient 144. In the case of group results, summary or statistical information may be generated and/or stored relating to the group in addition to or instead of individual assessment results.

Figure 1D:
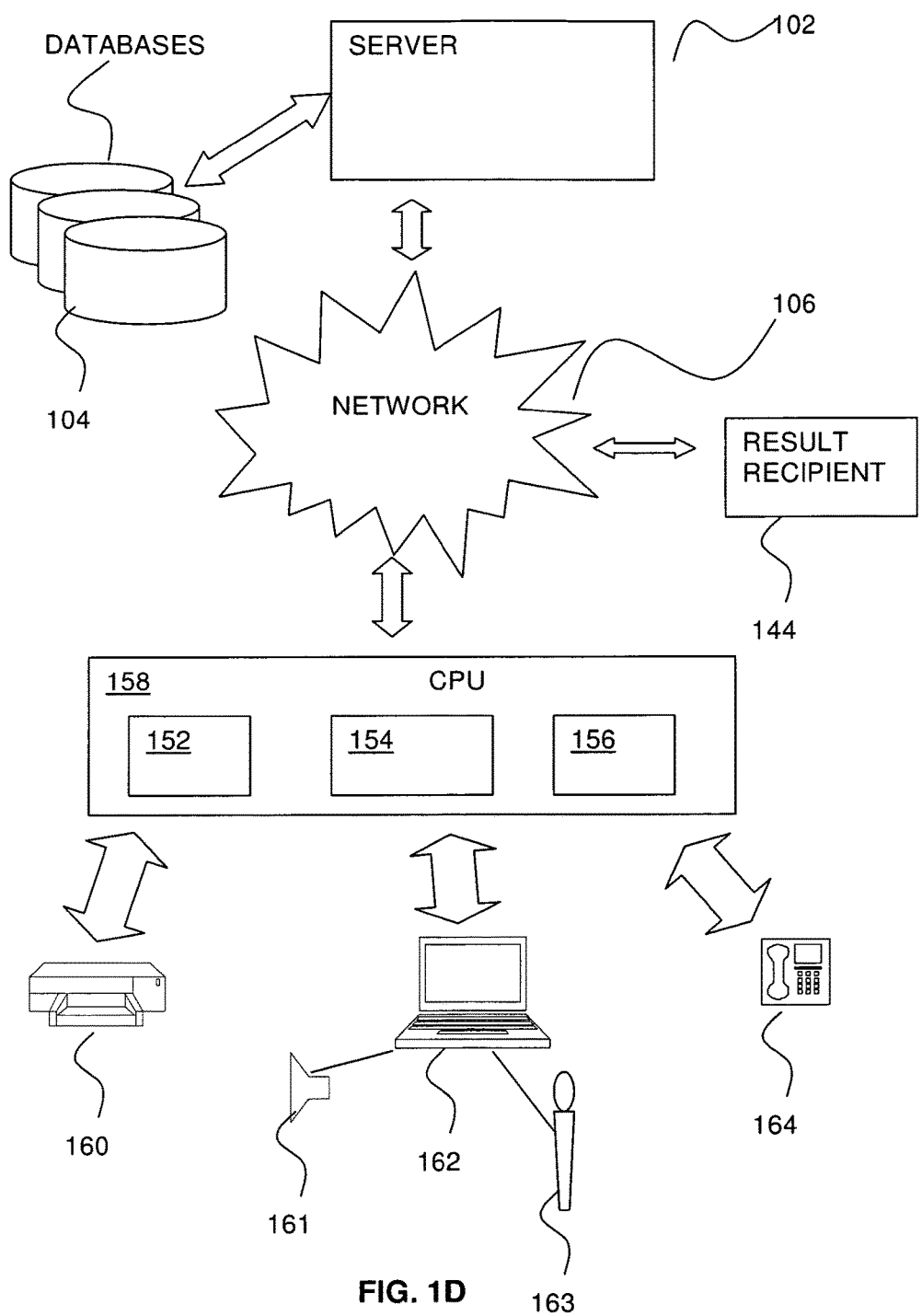
FIG. 1D shows a fourth schematic of a system for delivering assessments

FIG. 1D shows a system in which an assessment instance is delivered to different delivery media. The assessment instance in medium-independent form may be delivered to a processor or more than one processor 158 in a medium-independent form. The processor includes interface modules 152, 154, 156, with one module for each delivery medium. Three delivery media are shown: a printer 160, for delivering paper test output; a laptop 162 having a wireless network interface for administering computerized assessments; and a telephone 164 (wired or wireless) for delivering a purely auditory assessment. The printer may also include a scanner for receiving written assessment responses. The laptop may be connected to a loudspeaker 161 and a microphone 163 so that it can receive and deliver sound, such as speech or music; in addition to receiving input via its keyboard and pointer device and delivering output via its screen. The laptop might also include a camera for capturing visual responses.

The assessment instance may include a separate subset adapted for each type of medium. For example, the paper medium can only deliver visual questions, whether graphic or text. The laptop can deliver visual and audio information. The telephone can only deliver audio information. Only questions appropriate for the particular medium should be present in the assessment intended for that medium. Some of the delivery media may be especially optimized for special-needs assessment takers. Thus, even if the physical delivery medium supports a question or other information format, the assessment may be defined to employ an adapted subset of the supported types.

In some cases, the circumstances of administration of the assessment are recorded. For example, an audiovisual recording of the assessment may be maintained, in order to verify uncorrupted assessment circumstances.

Figure 2A:
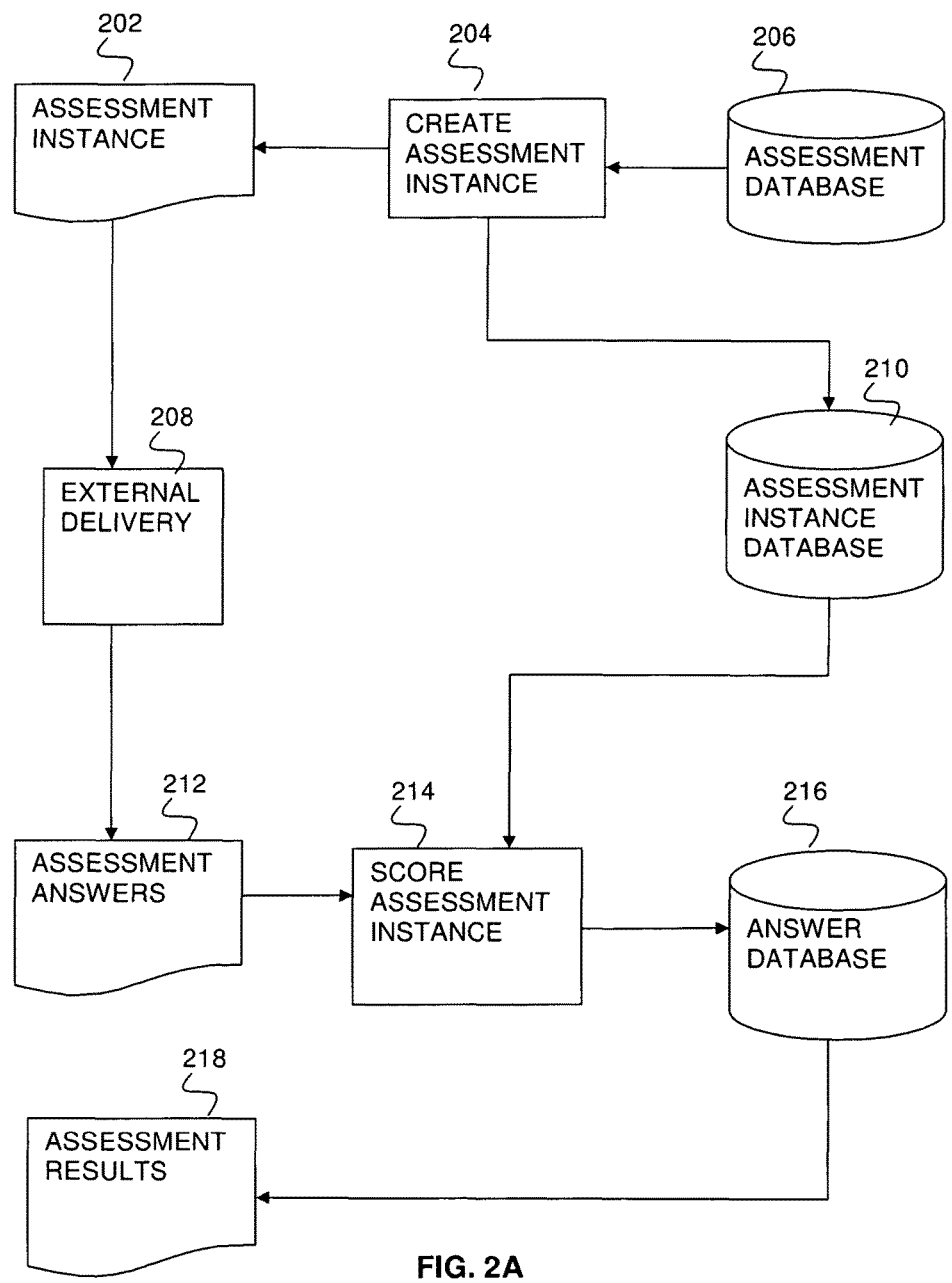
FIG. 2A shows a flow chart relating to operation of the server 102 in conjunction with capturing assessment instances.

FIG. 2A shows a high level flow diagram of an embodiment of the operation of the invention within server 102. At 204, an assessment instance is created responsive to a user request. This creation involves selecting assessment information from the assessment database 206. Thereafter an assessment instance 202 is communicated for external delivery at 208 and also stored in an assessment instance database 210. Assessment answers 212 are provided responsive to external delivery 208. These answers (raw data or processed and interpreted) are then provided to process 214 where the assessment instance is scored. The result of scoring—and optionally the raw data—is stored in the response database 216 and communicated as assessment results 218.

Figure 2B:
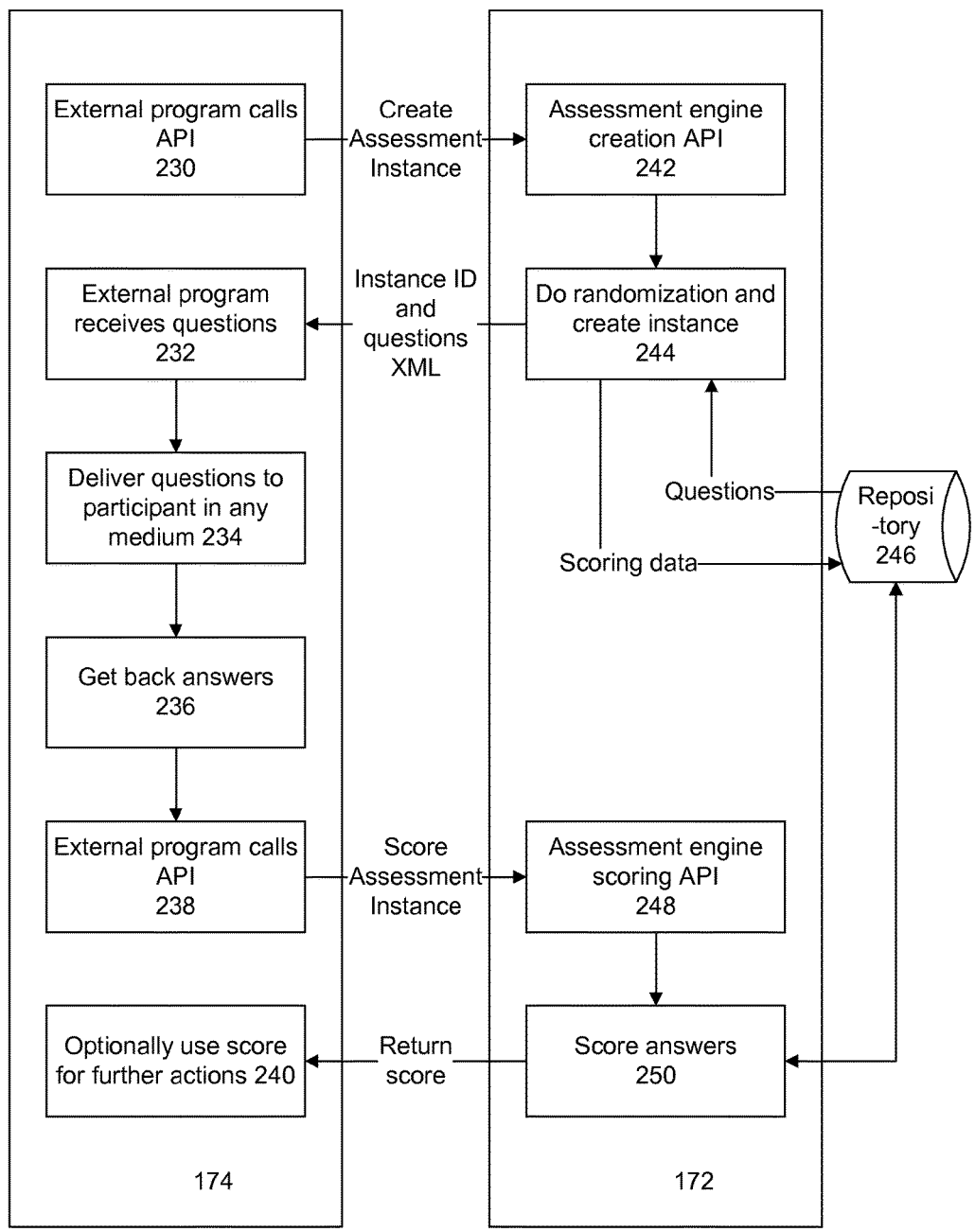
FIG. 2B is a schematic showing tasks relating to the invention divided between an application program 174 and an API 172

FIG. 2B is a schematic showing tasks relating to the invention divided between an application program or programs 174 and an API 172. First, at 230, the external program calls the API, requesting creation of an assessment instance. Then the API starts the assessment creation engine at 242. At 244, the instance is created including random selection of questions from repository 246. The assessment instance, including selected questions, instance identifier (ID), and scoring data are then stored back to the repository 246. An XML document representing the question portion of the assessment instance, together with the instance ID are communicated back to the calling program at 232. The XML document may be medium independent, that is, the content and organization within an XML document can be readily interpreted from a generic platform, without non-standard hardware resources or computing environment. The application program then delivers questions to a participant/ assessment taker in any medium at 234. This may involve use of a delivery interface module 152, 154, 156. Responses are then received back at 236. Once the administration of the assessment is complete, the external program 174 then again calls the API per 238. Responsive to this call, the API 172 initiates at 248 a scoring engine, which scores the responses at 250 and returns the score to the external program 174, which may perform further operations on those responses at 240. The scores are also delivered to the repository 246. This schematic shows creation of the assessment instance and storing of the assessment instance as being part of a single API; however, they may be in separate APIs. This schematic also shows a single repository for all data at 246, but more than one might be used, as in FIG. 2A.

Figure 3:
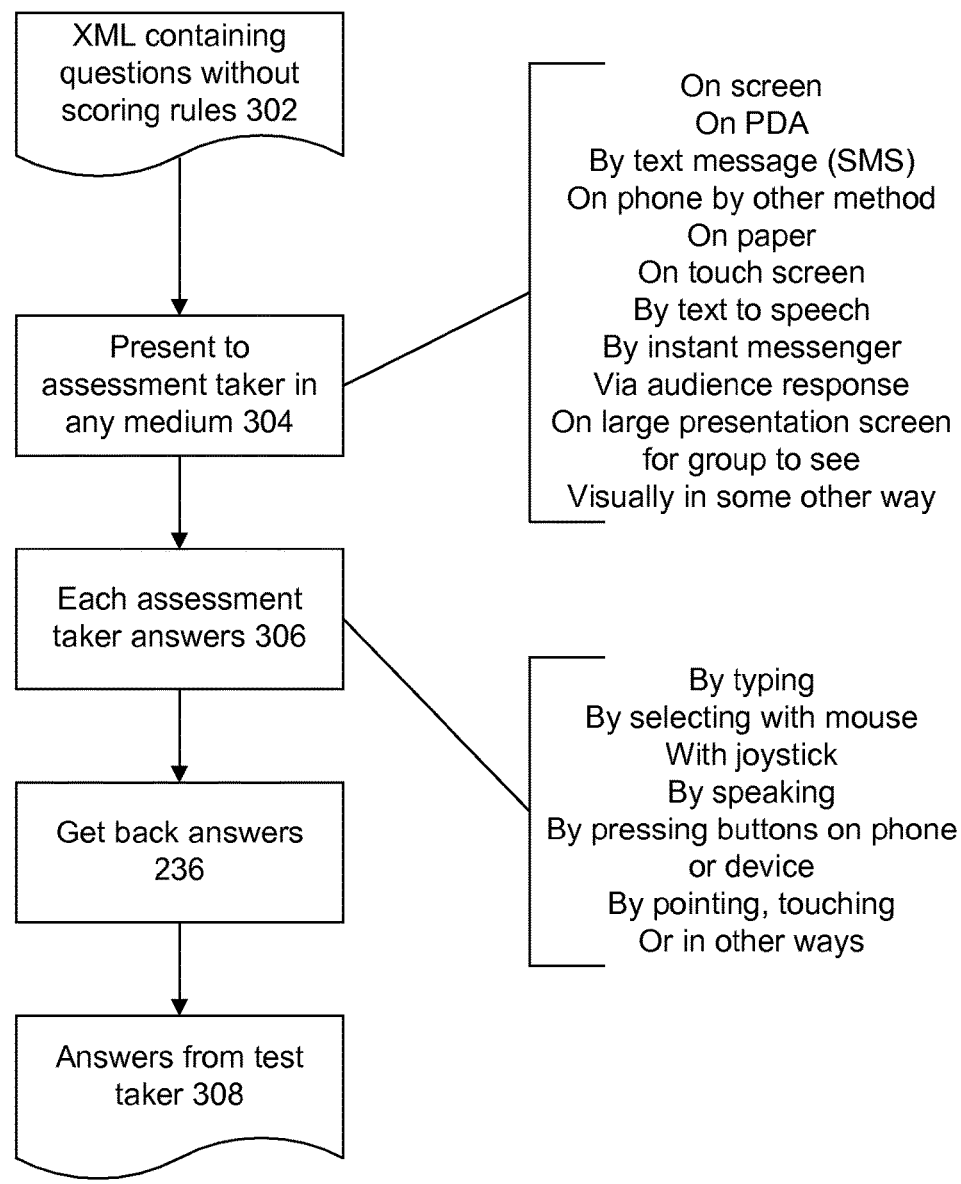
FIG. 3 is a flow diagram relating to delivering assessments

FIG. 3 is presented for the purpose of expanding discussion of delivery of the assessment instance. At 302, the assessment instance is presented in XML, a medium-independent format. Other medium-independent formats may be used. At 304, the assessment instance is then presented to assessment takers through any medium. These might include a screen, a PDA or other portable device, text message (SMS), telephone, printed to paper, a touch screen, by text to speech, by instant messenger, by audience response, on a large presentation screen for a group to see, or in some other visual way. Sending a medium independent format message from an API, e.g. 172, has the advantage that particular media can be supported locally, using software resident in the system 110 of an assessment administrator, medium interface modules 152, 154, 156, or in the target device 112, 160, 162, 164. The local facility, of whatever sort, then interprets the defined assessment presentation data, and optionally filters the XML to limit the attempted presentation to that data supported by the target device. A generic assessment in XML format may be received and modified as appropriate. Alternately, the target device may communicate its limitations, and possibly the limitations/disabilities of the test-taker, to the server so that the server can generate an appropriate target-specific XML file tailored for direct administration, without significant logical processing to alter the information presented. Then at 304 the assessment taker answers or provides responses. This also might be via many different media such as keyboard, a pointer device such as a mouse, joy stick or track ball, voice recognition, pressing buttons on a phone or other device, pointing or other motion detection, touching, gesturing, or in other ways.

Figure 4:
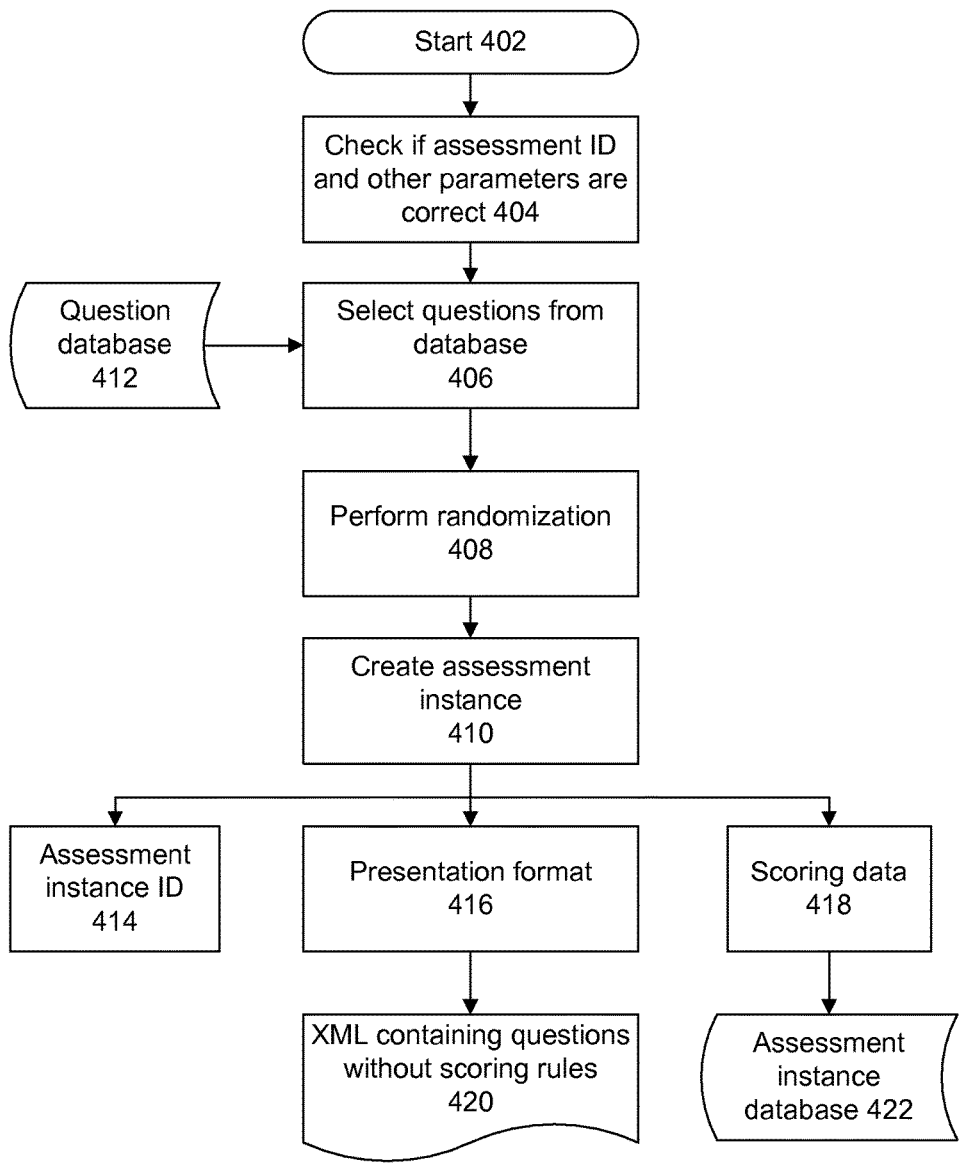
FIG. 4 is a flow diagram relating to creating and storing an assessment instance

FIG. 4 expands the aspects of FIG. 2A relating to creation of the assessment. At 402 the assessment instance procedure is started. At 404, an identifier for the assessment is created or received along with parameters relating to the assessment. Then questions are selected at 406 from the database 412. This selection may be based on parameters and/or a randomization process. Questions may be grouped into topics or sub-topics. Part of the randomization process might involve selecting a subset of question from each topic or sub-topic, or even a subset of available topics. Such selections can change the focus of the assessment.

Other information may also be retrieved from the assessment database such as a set of choices for each question and an indication of question type. Randomization may include changing the order of choices in a multiple choice question.

Question selection may be constrained by type.

An example of an indication of question type is a range of responses. For instance, if the question is multiple-choice, the range of responses might be A-D. This question type will allow for later checking of response validity. For instance, if a response of E or "horse" is received, checking against the question type will indicate an invalid response.

Another example of question type is an indication of whether a question is suitable for a particular medium. An assessment instance may include subsets, where one subset is intended for one medium and another subset is intended for another medium. The subsets may have some questions that overlap and others that are only for a particular medium. For instance, if the test is to be delivered via speech only, questions involving graphics should not be selected.

The questions themselves may be parameterized. For instance, a math problem might require a response to a formula in the form $x*y=?$. For an assessment of multiplication, generation of the assessment instance might involve assigning actual numbers to the variables, so that the problem becomes $4*3=?$ for the actual assessment instance. This is an example of resolving a parameterized question into an administrable format.

Thereafter randomization on the questions might be performed at 408. Randomization can change the order of the questions and also the order of choices within multiple choice questions.

Also, a database might store extra choices for each question. For example, if a multiple choice question is supposed to have 4 choices, then the database might store 10 choices. The randomization process might involve selecting four of those ten to create the question within the assessment instance.

The actual assessment instance created at 410 will include the assessment instance ID 414, a presentation format 416, and scoring data 418. The presentation format may include summary information, so that an assessment administrator may verify that a correct assessment is being delivered. The assessment is delivered in XML at 420, though it is also stored in the assessment database. The scoring data 418 is typically not sent out so it only goes to the assessment instance database 422.

Figure 5:
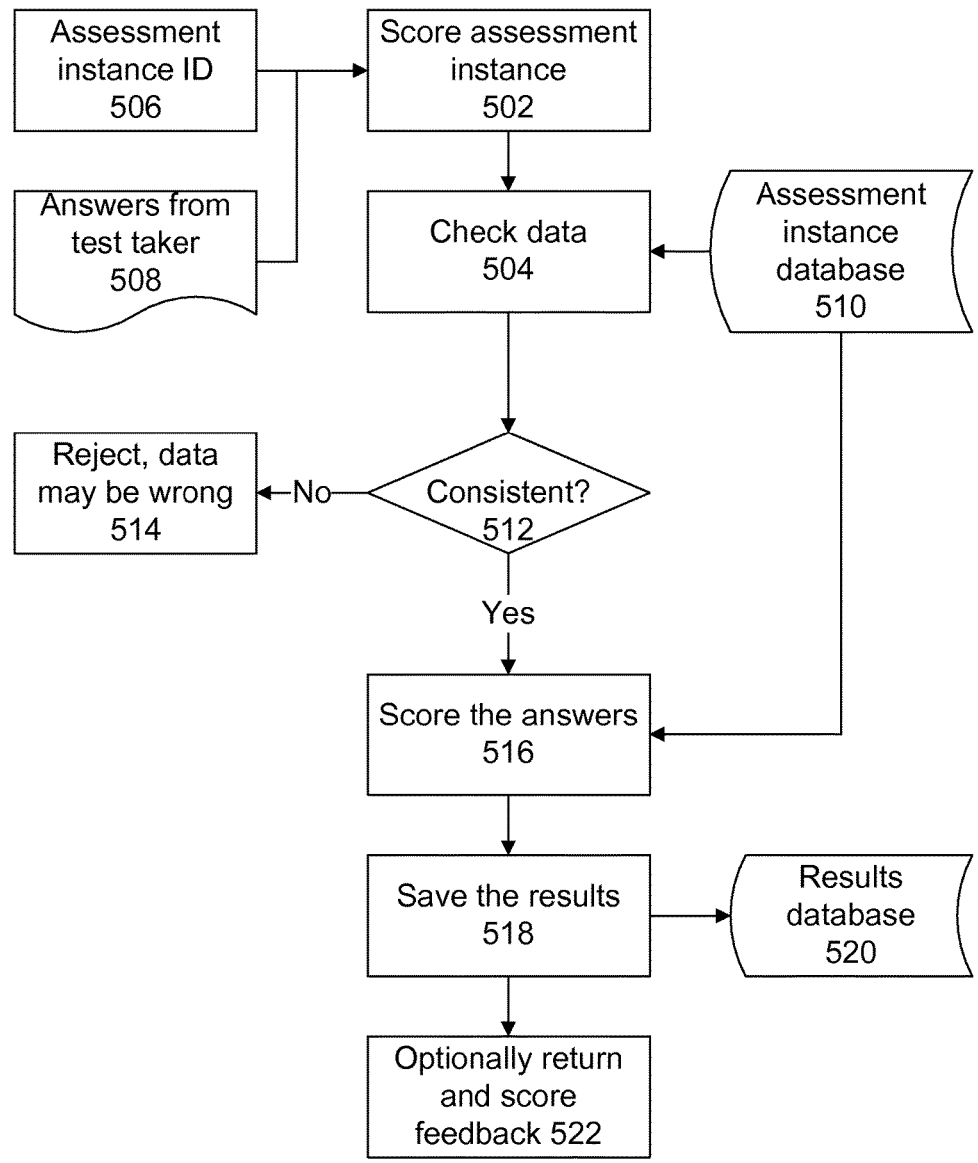
FIG. 5 is a flow diagram relating to scoring an assessment instance.

FIG. 5 shows more of the process 502 of scoring assessments. The process receives the assessment instance ID and responses from the test back from the assessment taker. The data is then checked at 504 against the assessment instance database 510. If the data is consistent with the assessment instance, scoring may proceed at 516 based on information in the assessment instance database. If the data is inconsistent with the assessment instance—for instance if the responses are out of range or inconsistent with question type—an error message may be delivered at 514. After the responses are scored at 516, the results may be saved at 520 and/or returned to an assessment administrator or assessment taker at 522.

Figure 6:
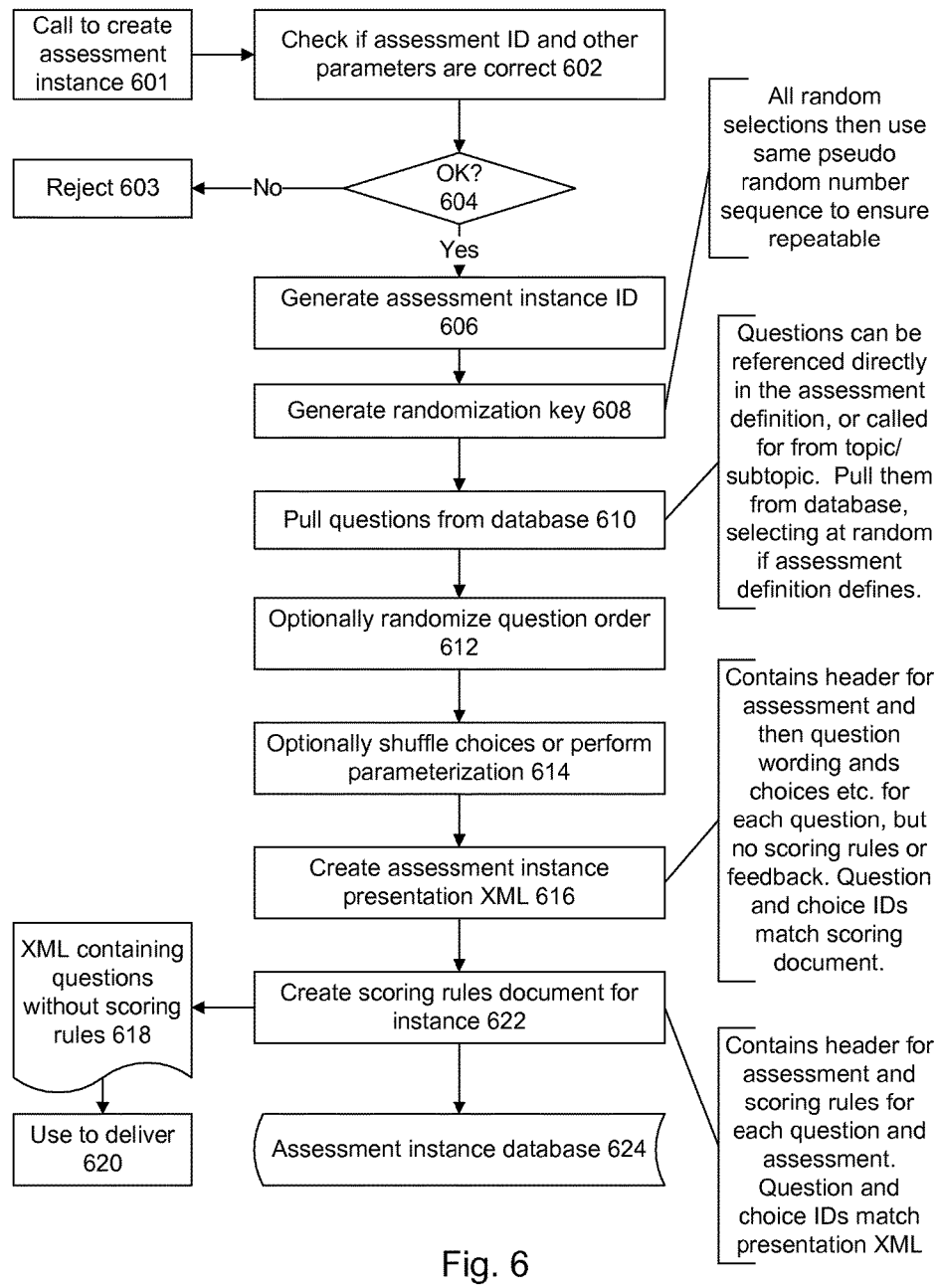
FIG. 6 is a flow diagram similar to FIG. 4, but with more detail at some points.

FIG. 6 is a flow diagram similar to FIG. 4, but with more detail at some points. At 601, a call is generated to create an assessment instance. At 602/604 is a check of whether the assessment ID and other parameters are correct. If not, the call is rejected at 603. If so, the call is accepted at 604 and an assessment ID is generated at 606. A randomization key is generated at 608. All random selections then preferably may use the same pseudo random number sequence to ensure repeatability. At 610, questions are pulled from the database. Questions can be referenced directly in the assessment definition, or called for from topic/subtopic. Questions pulled from the database—at random if the assessment definition so specifies. Optionally, at 612, the question order may also be randomized. Optionally, at 614, choices are shuffled or parameters in parameterized questions are resolved. Then, at 616, presentation XML is generated for the assessment instance. This XML contains a header for the assessment instance, then question wording and choices for each question. No scoring rules or feedback is added at this point. Question and choice ID's will match a scoring rules document. The output of box 616 is XML containing questions without scoring rules at 618. These are used for delivering the assessment instance at 620. After the assessment instance presentation XML is created, a scoring rules document for the assessment instance is created at 622. This document contains a header for the assessment and scoring rules for each question and for the assessment. Question and choice IDs match the presentation XML and the scoring rules document. Then both the presentation XML and the scoring rules document are stored in the assessment instance database at 624.

Typically, the scoring and question information in the assessment instance are separate XML documents linked by an identifier or reference. Scoring may involve individual responses, group responses, or individual responses consolidated into a group after scoring.

When an assessment instance is generated an instance definition is retained, holding details of the questions selected, the shuffling of questions and choices and the IDs given to questions and choices. The scoring criteria for the assessment are also retained, including assessment outcomes and all topic information necessary for topic scoring and topic pre-requisites.

An assessment administration system in accordance with the invention may be used to store and administer various different assessment instances. Each instance may be administered multiple times to the same individual. An assessment instance may be administered to multiple individuals at different times or to a group of individuals simultaneously. Different assessment instances may be designed to assess different topics. Such different assessment instances might be administered to different assessment takers, or to the same assessment taker at different times. Multiple distinct assessment instances may be stored and administered all of which relate to the same topic. Different respective assessment instances may be delivered simultaneously or at different times to respective individuals. Those individuals may be co-housed within a single physical administration facility, or dispersed in multiple administration facilities. Distinct assessment instances relating to the same topic may be delivered simultaneously via distinct delivery media. Distinct assessment instances relating to different topics maybe delivered in the same physical location via the same or different media.

Scoring results may be presented to an assessment administrator, to the individual assessment taker, or to a third party. Scoring results may be formatted as individual results or as group results. Scoring results may indicate sub-group results. Sub-group results may relate to different topics or sub-topics, different assessment administration facilities, or different dates of administration. Group or individual progress on a topic or sub-topic may be tracked relative to different stored assessment instances and topics.

Statistical analyses including calculations of mean, mode, standard deviations, correlation, curve matching may be applied to group, sub-group results, and even individual results of assessment instances. Assessment results may also be analyzed with respect to various statistics, both for validation and scoring.

1 Assessment Administration System

While the examples of FIGS. 1A, 1B, and 1C relate to automated administration, the concept of an assessment instance can also be used with conventional bubble sheets for responses and printed assessments. The bubble sheets are scanned and the responses returned to an assessment administration system for scoring and the results added to the assessment database.

The overall scores for each participant can be reported on from the assessment administration system using a "Coaching" report or another report type.

The preferred embodiment includes processes to
 1. create an assessment instance
 2. score an assessment instance
 3. get an assessment instance
 4. get an assessment instance summary
 5. get an assessment instance response constraints
 6. delete an assessment instance 1.1 Create Assessment Instance The Create Assessment Instance procedure returns a full XML representation of an assessment specified by the identifier ("ID"), with questions picked and shuffled at random according to selection methods in the assessment definition, using a key if one is defined. Using the same key will always result in the same selection and shuffling. The key may be generated by a regular pattern, random or pseudorandom process.

Only questions matching the types set in QuestionTypeList will be included in those selected (if this is blank or omitted, all question types will be included).

Questions are numbered sequentially through the entire document and choices sequentially through each question.

If Save_Instance is false or omitted, the instance information will not be saved on the server, only the XML Delivery Assessment Instance will be returned and the Instance ID will be set to 0. This means the instance is for information only and cannot be scored later.

Expiry provides advice for future applications to control how assessment instance definitions saved on the server may be deleted for clean-up purposes.

If Expiry=0 there is no explicit deletion advice for the assessment instance
 If Expiry=1 the assessment instance should not be deleted until after the Expiry_Date has been passed
 If expiry=2 the assessment instance may be deleted after it has been used once by a call to ScoreAssessmentInstance.

The Delivery Assessment Instance does not include jump blocks, topic reporting information, topic pre-requisites, or topic scoreband overrides. However, in other embodiments, one or more of these elements may be included.

Each question is represented in simplified XML, preferably with all scoring information removed.

Explanations of Variables.

Input:
- Assessment_ID—string
- Random_Key—string [optional]—key used for random selection, shuffling, etc.
- Save_Instance—boolean [optional]—if false do not save assessment instance data
- Expiry—integer [optional]—when assessment instance may be deleted—0|1|2
  - 0—never deleted (default is omitted)
  - 1—deleted after expiry date has passed
  - 2—delete after the assessment instance has been scored once
- Expiry_Date—date [optional]
  - if Expiry=1 this defines a date after which the assessment instance may be deleted Output:
- Assessment Instance
  - Assessment_ID—string
  - Instance_ID—string
  - Random_Key—string
  - Header
    - Assessment_Type—integer—0 Quiz, 1 Test, 2 Survey, 3 Exam
    - Name—string
    - Description—string
    - Author—string—name or ID of person who created the assessment
    - Save_Answers—boolean—responses saved to answer database
    - Save_Answer_Data—boolean—whether full answer data is saved
    - Number_Of_Blocks—integer—no. of question blocks in assessment
    - Number_Of_Questions—integer—no. of questions in assessment
    - Course—[optional]—string—name of Assessment Folder
    - Time_Limit—[optional]—number—time limit in minutes
  - QuestionBlock
    - Block_Name—string—the name of the block
    - Introduction—string—introductory text
    - QuestionList (order shuffled if appropriate)
    - Question—XML (simplified for delivery)

1.1.1 Error Handling

Error handling in the preferred embodiment is implemented by returning a SOAP (Simple Object Access Protocol, a lightweight XML based protocol used for invoking web services and exchanging structured data and type information on the Web) fault message if a method cannot fulfill the request in any way.

CreateAssessmentInstance returns a SOAP fault in the following circumstances:

- No assessment with the specified Assessment_ID exists.
- A Question_Type is specified which does not match a known question type.
- Question_Numbering, Choice_Numbering Option_Numbering formats are not understood.
- No questions can be found in the assessment matching the required question type(s). An error may be raised if the required number of questions are not be available.
- The request header or message is invalid or an internal error of some sort occurs.

1.1.2 Example

```
<CreateAssessmentInstance xmlns:m="http://questionmark.com/QMWISe/">
    <AssessmentInstanceDefinition>
        <Assessment_ID>2438215591574542</Assessment_ID>
        <Random_Key>String</Random_Key>
        <Save_Instance>true</Save_Instance>
        <Expiry>-0</Expiry>
        <Expiry_Date>2001-12-17</Expiry_Date>
    </AssessmentInstanceDefinition>
</CreateAssessmentInstance>
<CreateAssessmentInstanceResponse>
  <AssessmentInstance>
    <Assessment_ID>4117626686784785</Assessment_ID>
    <Instance_ID>0184563</Instance_ID>
    <Random_Key>A</Random_Key>
    <Header>
      <Assessment_Type>3<Assessment_Type>
      <Name>Simple example assessment</Name>
      <Description>A simple Perception assessment</Description>
      <Author>Paul Roberts</Author>
      <Save_Answers>true</Save Answers>
      <Save_Answer_Data>true</Save_Answer_Data>
      <Number_Of_Blocks>1</Number_Of_Blocks>
      <Number_Of_Questions>2</Number_Of_Questions>
      <Course>Example Assessments</Course>
      <Time_Limit>30</Time_Limit>
    </Header>
    <QuestionBlock>
      <Block_Name>Geography</Block_Name>
      <Introduction_Text>Please answer all questions</Introduction_Text>
      <QuestionList>
        <QUESTION ID,"1" MAX,"1 ">
          <CONTENT>What is the capital of France ?</CONTENT>
          <ANSWER QTYPE="MC">
            <CHOICE ID="1">
              <CONTENT TYPE="text/plain">Rome</CONTENT>
            </CHOICE>
            <CHOICE ID="2">
              <CONTENT TYPE="text/plain">Berlin</CONTENT>
```

```
            </CHOICE>
            <CHOICE ID="3">
              <CONTENT TYPE="text/plain">Paris</CONTENT>
            </CHOICE>
            <CHOICE ID="4">
              <CONTENT TYPE="text/plain">London</CONTENT>
            </CHOICE>
          </ANSWER>
        </QUESTION>
        <QUESTION ID="2" TOPIC_ID="67792997" MAX="1">
          <CONTENT>Which country is Paris the capital of ?</CONTENT>
          <ANSWER QTYPE="MC">
            <CHOICE ID="1">
              <CONTENT TYPE="text/plain">England</CONTENT>
            </CHOICE>
            <CHOICE ID="2">
              <CONTENT TYPE="text/plain">France</CONTENT>
            </CHOICE>
            <CHOICE ID="3">
              <CONTENT TYPE="text/plain">Germany</CONTENT>
            </CHOICE>
            <CHOICE ID="4">
              <CONTENT TYPE="text/plain">Italy</CONTENT>
            </CHOICE>
          </ANSWER>
        </QUESTION>
      </QuestionList>
    </QuestionBlock>
  </AssessmentInstance>
</CreateAssessmentInstanceResponse>
```

1.2 Score Assessment Instance

The Score Assessment Instance (ScoreAssessmentInstance) procedure sends the responses to an assessment instance specified by ID for a single specified participant to be scored and entered into the response or answer database.

The ID of the record created in the A_Results table is returned in the response.

The participant must be identified, by name or any ID schema used by the external system; this is what will be shown in reporting. Participant details may also be specified, as may the group they are part of. Up to 10 special fields may also be specified to be used for demographic data for reporting purposes.

The response to each question is a response containing one or more choices.

The response list may be generated simply from the participant's responses or the response list returned by the procedure GetAssessmentInstanceReponseContraints may be used as a basis, with the additional information used as an aid to validating the responses before they are sent for scoring.

All responses are checked for validity (see Error Handling, section 1.2.1, below) before any are scored or written to the answer database.

The facility to send an email at the end of an assessment that exists when V4 assessments are delivered via session.dll is not supported, in this embodiment, but might be supported otherwise.

Explanation of variables

Input:
    Instance_ID - string
    Participant - string - participant name or ID
    Member_Group - [optional] - string
    Participant_Details - [optional] - string
    When_Finished - [optional] - time and date the assessment was completed Explanation of variables Monitor_Name - [optional] - string - the name of instructor who administered the assessment
    Special_1 - [optional] - string
    Special_2 - [optional] - string
    Special_3 - [optional] - string
    Special_4 - [optional] - string
    Special_5 - [optional] - string
    Special_6 - [optional] - string
    Special_7 - [optional] - string
    Special_8 - [optional] - string
    Special_9 - [optional] - string
    Special_10 - [optional] - string
    ResponseList
        Response
            Choice(s)
            Comment - [optional]- string
Output:
    Result_ID - string

1.2.1 Error Handling

ScoreAssessmentInstance returns a SOAP fault in the following circumstances:

- No assessment instance definition with the specified Instance_ID exists.
- No participant is specified.
- A question is included in the answer list with an ID that is not present in the assessment instance definition.
- A choice is included in a question in the answer list that is not present in that question in the assessment instance definition.
- More than one choice is specified for an answer that can only accept one choice (e.g. returning more than one choice to a multiple choice question)
- The request header or message is invalid or an internal error of some sort occurs.

1.2.2 Example
```
<ScoreAssessmentInstance>
<Instance_ID>0184563</Instance_ID>
    <Participant>John Smith</Participant>
    <Member_Group>Employees</Member_Group>
    <Participant_Details>emp/europe/js</Participant_Details>
    <When_Finished>2004-06-18T13:28:26</When_Finished>
    <Monitor_Name>Jane Doe</Monitor_Name>
    <Special_1>June training course</Special_1>
    <ResponseList>
    <Response id="1">
        <Choice id="3"/>
    </Response>
    <Response id="2">
        <Choice id="2"/>
        <Comment>I'm only guessing</Comment>
    </Response>
    </ResponseList>
</ScoreAssessmentInstance>
<ScoreAssessmentInstanceResponse>
    <Result_ID>1989031580</Result_ID>
</ScoreAssessmentInstanceResponse>
```

1.3 Get Assessment Instance

The Get Assessment Instance procedure (GetAssessmentInstance) retrieves the full XML representation of a previously created Delivery Assessment Instance. This allows an external system to deliver the same assessment, with the same randomization and shuffling, repeatedly over time without having to create the assessment instance and assessment instance definition again.

Explanation of Variables
  Input:
  Instance_ID—string
  Output:
  Same as CreateAssessmentInstance 1.3.1 Error Handling GetAssessmentInstance returns a SOAP fault in the following circumstances:
  No assessment instance definition with the specified Instance_ID exists.
  The request header or message is invalid or an internal error of some sort occurs.

1.4 Get Assessment Instance Summary

The Get Assessment Instance Summary ("GetAssessmentInstanceSummary") retrieves information about an assessment instance but not the questions and may be used as a 'reality check'.

Explanation of Variables
  Input:
  Instance_ID—string
  Output:
  Same as CreateAssessmentInstance without the QuestionList 1.4.1 Error Handling GetAssessmentInstanceSummary returns a SOAP fault in the following circumstances:
  No assessment instance definition with the specified Instance_ID exists.
  The request header or message is invalid or an internal error of some sort occurs.

1.4.2 Example
```
<GetAssessmentInstanceSummaryResponse>
    <AssessmentInstanceSummary>
        <Assessment_ID>4117626686784785</Assessment_ID>
        <Instance_ID>0184563</Instance_ID>
        <Random_Key>A</Random_Key>
        <Header>
            <Assessment_Type>3<Assessment_Type>
            <Name>Simple example assessment</Name>
            <Description>A simple Perception assessment</Description>
            <Author>Paul Roberts</Author>
            <Save_Answers>true</Save_Answers>
            <Save_Answer_Data>true</Save_Answer_Data>
            <Number_Of_Questions>2</Number_Of_Questions>
            <Course>Example Assessments</Course>
            <Time_Limit>30</Time_Limit>
        </Header>
    <AssessmentInstanceSummary>
<GetAssessmentInstanceSummaryResponse>
```

1.5 Get Assessment Instance Response Constraints

The Get Assessment Instance Response Constraints procedure ("GetAssessmentInstanceResponseConstraints") retrieves a summarized XML representation of the responses accepted to a previously created assessment instance. This allows an external system to validate the responses before calling ScoreAssessmentInstance. The number of questions, the number of permitted choices for each question and the permitted value of the choices can be checked.

See (section 2, below) for more details of how responses are handled in XML.

Explanation of Variables
  Input:
  Instance_ID—string
  Output:
  Instance_ID—string
  Number_Of_Questions—integer—the number of questions in assessment
  ResponseList
    Response
      choice_type attribute—string—id|string|number|coord
      choice_max attribute—integer—max number of choices accepted
      choice_num attribute—integer—number of choices in the question 1.5.1 Error Handling GetAssessmentInstanceScoring returns a SOAP fault in the following circumstances:
  No assessment instance definition with the specified Instance_ID exists.
  The request header or message is invalid or an internal error of some sort occurs.

1.5.2 Example
```
<GetAssessmentInstanceScoring>
    <Instance_ID>0184563</Instance_ID>
</GetAssessmentInstanceScoring>
<GetAssessmentInstanceScoringResponse>
    <Instance_ID>0184563</Instance_ID>
    <Num_Questions>2</Num_Questions>
    <ResponseList>
    <Response id="1" choice_type="id" choice_max="1" choice_num="4"/>
    <Response id="2" choice_type="id" choice_max="1" choice_num="4"/>
    </ResponseList>
</GetAssessmentInstanceScoringResponse>
```

1.6 Delete Assessment Instance

The Delete Assessment Instance ("DeleteAssessmentInstance") removes the assessment instance definition for a previously created assessment instance from the assessment instance database.

Explanation of Variables
  Input:
    Instance_ID—string
    System_ID—string
  Output:
    none

1.6.1 Error Handling

GetAssessmentInstance returns a SOAP fault in the following circumstances:
  No assessment instance definition with the specified Instance_ID exists.
  The request header or message is invalid or an internal error of some sort occurs.

2 Response XML Format

The response to each question is held within a Response element with the ID attribute matching that of the question in the delivery format.

The answer to each choice in the question is provided by a Choice element with the ID attribute matching that of the choice in the delivery format.

In some assessments, the order of the questions within the answer list and the order of choices within the question are not significant. If questions are not answered they may be omitted from the answer list or included but with no choices included.

The content of the choice element for a response depends on the question type and matches the data required for processing the response.

In the simplest case, when choices can either be selected or not, as in multiple choice and multiple response questions, the existence of the choice element within a question signifies that the choice was selected.

For more complex cases, where the choice response has an actual value, the response is held in the content of the Choice element as a string. The response data is interpreted as text, a number or a coordinate according to the question type.

2.1 Example

```
<ScoreAssessmentInstance>
. . .
<ResponseList>
<!--Multiple Choice-->
<Response id="1">
    <Choice id="C"/>
</Response>
<!--Multiple Response-->
<Response id="2">
    <Choice id="A"/>
    <Choice id="C"/>
</Response>
<!--Text match-->
<Response id="2">
    <Choice id="A">Paris</Choice>
</Response>
<!--Numeric-->
<Response id="3">
    <Choice id="A">9</Choice>
</Response>
<!--Drag and drop-->
<Response id="4">
    <Choice id="A">53,66</Choice>
</Response>
<!--Unanswered-->
<Response id="5"/>
<!--With a comment-->
<Response id="6">
    <Comment>I don't know</Comment>
</Response>
</ResponseList>
```

3 Response Scoring XML Format

GetAssessmentInstanceResponseConstraints returns a representation of all the questions in the assessment and details of the responses that may be returned for each question.

It is intended to aid the validation of responses submitted with ScoreAssessmentInstance and so reduce the chances of errors occurring in that method.

The response scoring information is similar to that used for the responses themselves, but with the Response element containing additional attributes defining the number of choices that can be accepted for each question and the type of those choices.

The ResponseList returned by GetAssessmentInstanceResponseContraints may be used as the basis for the ResponseList submitted with ScoreAssessmentInstance—the external system can work through each Response and add one or more Choices then submit it for scoring Each response element contains attributes giving information about how many choices may be accepted and what the format of the choices should be
  Choice_type may be one of 4 different values:
    id—the presence of a choice with that id means that choice was selected
    string—the choice element should contain a text that will be used as the answer
    number—the choice element should contain a number (integer, floating point or scientific notation)
    coord—the choice element should contain two numbers separated by a comma which are the x y coordinates of the answer
  Choice_max is the maximum number of choices accepted, for instance a multiple choice question may only have one choice as the answer
  Choice_num is the total number of choices in the question The additional informative attributes in the response elements may be retained when submitting for scoring, they will be ignored.

3.1 Example

```
<GetAssessmentInstanceScoringResponse>
<ResponseList>
. . .
<!--Multiple Choice (MC|TF|YN|LKS)-->
    <Response id="1" choice_type="id" choice_max="1" choice_num="4" choice_last="D"/>
<!--Multiple Response (MR)-->
    <Response id="2" choice_type="id" choice_max="4" choice_num="4" choice_last="D"/>
<!--Text match and Essay (TM|ESSAY)-->
    <Response id="3" choice_type="string" choice_max="1" choice_num="1" choice_last="A"/>
<!--Multiple text types (FIB|SEL|MATCH|RANK|SAB)-->
    <Response id="3" choice_type="string" choice_max="3" choice_num="3" choice_last="C"/>
<!--Numeric (NUM)-->
    <Response id="4" choice_type="number" choice_max="1" choice_num="1" choice_last="A"/>
<!--Drag and drop (HOT)-->
```

```
<Response id="5" choice_type="coord" choice_max="1"
choice_num="1" choice_last="A"/>
</ResponseList>
```

4 Steps to Deliver and Score an Assessment Instance
  1. Obtain a list of available assessments by calling the preferred embodiment GetAssessmentListByAdministrator.
  2. Choose the assessment to be delivered
  3. Obtain a assessment instance of the assessment by calling CreateAssessmentInstance with the ID of the selected assessment.
  4. Use the XML returned by CreateAssessmentInstanceResponse to create a Word document for printing.
  5. Present the assessment to one or more participants
  6. Save the answers to each of the questions along with the participant name or ID and any demographic data to be used
  7. Obtain a scoring response list for the assessment by calling GetAssessmentInstanceResponseContraints with the assessment instance ID
  8. For each of the participants who completed the assessment
     a. Use the scoring response list to validate their answers
     b. Create a response list of their answers
     c. Call ScoreAssessmentInstance with their name and other data and their response list 5 How to Hold Scoring Data for Processing The Scoring Assessment Instance for an assessment instance is held in the following table.

| | D_Scoring Table | |
|---|---|---|
| Field Name | Description | Type |
| Instance_ID | Unique identifier for this assessment zero). | Long Integer |
| Version | Version of the class being serialized | Integer |
| Data | The class serialized as a binary dat | Binary object |

The structure of a Scoring Assessment Instance is best understood by looking at its XML format, for example:

```
<ScoringAssessmentInstance>
    <MaxScore>0</MaxScore>
    <Score>0</Score>
    <Percent>0</Percent>
    <QUESTION>
    <Number>1</Number>
    <Type>TF</Type>
    <Revision>1</Revision>
    <Status>0</Status>
    <Block>0</Block>
    <Question_MID>3197263</Question_MID>
    <Question_LID>95614120</Question_LID>
    <Topic_ID>1841060952</Topic_ID>
    <Topic>ReportedTopic1</Topic>
    <Max>1</Max>
    <Min>-2147483648</Min>
    <Answered>false</Answered>
    <Outcome_Number>0</Outcome_Number>
    <Outcome_Exponential>0</Outcome_Exponential>
    <Outcome_Exponential_2>0</Outcome_Exponential_2>
    <Score>0</Score>
    <Feedback />
    <OutcomesCount>2</OutcomesCount>
    <Description>1</Description>
    <Wording />
    <Answer MAXRESPONSE="1">
       <Choice id="1">True</Choice>
       <Choice id="2">False</Choice>
    </Answer>
    <Outcome>
       <ID>0 True</ID>
       <Number>1</Number>
       <Condition>"1"</Condition>
       <Continue>false</Continue>
       <Action>Score</Action>
       <Score>1</Score>
       <Feedback />
    </Outcome>
    <Outcome>
       <ID>1 False</ID>
       <Number>2</Number>
       <Condition>"2"</Condition>
       <Continue>false</Continue>
       <Action>Score</Action>
       <Score>0</Score>
       <Feedback />
    </Outcome>
    </QUESTION>
    <QUESTION>
    <Number>2</Number>
    <Type>TF</Type>
    <Revision>1</Revision>
    <Status>0</Status>
    <Block>0</Block>
    <Question_MID>81586259</Question_MID>
    <Question_LID>53839980</Question_LID>
    <Topic_ID>1841060952</Topic_ID>
    <Topic>ReportedTopic1\ReportedTopic2</Topic>
    <Max>1</Max>
    <Min>-2147483648</Min>
    <Answered>false</Answered>
    <Outcome_Number>0</Outcome_Number>
    <Outcome_Exponential>0</Outcome_Exponential>
    <Outcome_Exponential_2>O</Outcome_Exponential 2>
    <Score>0</Score>
    <Feedback />
    <OutcomesCount>2</OutcomesCount>
    <Description>1</Description>
    <Wording />
    <Answer MAXRESPONSE="1">
       <Choice id="1">True</Choice>
       <Choice id="2">False</Choice>
    </Answer>
    <Outcome>
       <ID>0 True</ID>
       <Number>1</Number>
       <Condition>"1"</Condition>
       <Continue>false</Continue>
       <Action>Score</Action>
       <Score>1</Score>
       <Feedback />
    </Outcome>
    <Outcome>
       <ID>1 False</ID>
       <Number>2</Number>
       <Condition>"2"</Condition>
       <Continue>false</Continue>
       <Action>Score</Action>
       <Score>0</Score>
       <Feedback />
```

```xml
</Outcome>
</QUESTION>
<QUESTION>
<Number>3</Number>
<Type>TF</Type>
<Revision>1</Revision>
<Status>0</Status>
<Block>0</Block>
<Question_MID>32939018</Question_MID>
<Question_LID>36282523</Question_LID>
<Topic_ID>1841060952</Topic_ID>
<Topic>ReportedTopic1\ReportedTopic2\Reported
    Topic3</Topic>
<Max>1</Max>
<Min>-2147483648</Min>
<Answered>false</Answered>
<Outcome_Number>0</Outcome_Number>
<Outcome_Exponential>0</Outcome_Exponential>
<Outcome_Exponential_2>O</Outcome_Exponential 2>
<Score>0</Score>
<Feedback />
<OutcomesCount>2</OutcomesCount>
<Description>1</Description>
<Wording />
<Answer MAXRESPONSE="1">
    <Choice id="1">True</Choice>
    <Choice id="2">False</Choice>
</Answer>
<Outcome>
    <ID>0 True</ID>
    <Number>1</Number>
    <Condition>"1"</Condition>
    <Continue>false</Continue>
    <Action>Score</Action>
    <Score>1</Score>
    <Feedback />
</Outcome>
<Outcome>
    <ID>1 False</ID>
    <Number>2</Number>
    <Condition>"2"</Condition>
    <Continue>false</Continue>
    <Action>Score</Action>
    <Score>0</Score>
    <Feedback />
</Outcome>
</QUESTION>
<QUESTION>
<Number>4</Number>
<Type>MC</Type>
<Revision>2</Revision>
<Status>0</Status>
<Block>0</Block>
<Question_MID>30112904</Question_MID>
<Question_LID>70960993</Question_LID>
<Topic_ID>0</Topic_ID>
<Topic>3MC</Topic>
<Max>0</Max>
<Min>-2147483648</Min>
<Answered>false</Answered>
<Outcome_Number>0</Outcome_Number>
<Outcome_Exponential>0</Outcome_Exponential>
<Outcome_Exponential_2>O</Outcome_Exponential 2>
<Score>0</Score>
<Feedback />
<OutcomesCount>3</OutcomesCount>
<Description>Q1</Description>
<Wording>Q1</Wording>
<Answer MAXRESPONSE="1">
    <Choice id="1">b</Choice>
    <Choice id="2">c</Choice>
    <Choice id="3">a</Choice>
</Answer>
<Outcome>
    <ID>0 a</ID>
    <Number>1</Number>
    <Condition>"3"</Condition>
    <Continue>false</Continue>
    <Action>Score</Action>
    <Score>0</Score>
    <Feedback />
</Outcome>
<Outcome>
    <ID>1 b</ID>
    <Number>2</Number>
    <Condition>"1"</Condition>
    <Continue>false</Continue>
    <Action>Score</Action>
    <Score>0</Score>
    <Feedback />
</Outcome>
<Outcome>
    <ID>2 c</ID>
    <Number>3</Number>
    <Condition>"2"</Condition>
    <Continue>false</Continue>
    <Action>Score</Action>
    <Score>0</Score>
    <Feedback />
</Outcome>
</QUESTION>
<EndBlock>
<Minimum>0</Minimum>
<Maximum>50</Maximum>
<Name>Less than 50 (over 50 in RT3)</Name>
<Message><P>Moderate    Pass</P></Mes-
    sage>
<TopicPreRequisite>
    <Topic_ID>241997142</Topic_ID>
    <Minimum>50</Minimum>
    <Maximum>100</Maximum>
</TopicPreRequisite>
</EndBlock>
<EndBlock>
<Minimum>50</Minimum>
<Maximum>100</Maximum>
<Name>Over 50</Name>
<Message>Pass</Message>
</EndBlock>
<EndBlock>
<Minimum>0</Minimum>
<Maximum>100</Maximum>
<Name>default</Name>
<Message>Fail</Message>
</EndBlock>
<ReportedTopic>
<Topic_ID>241997142</Topic_ID>
<Name>ReportedTopic1\ReportedTopic2\Reported
    Topic3</Name>
<Description />
<QuestionNums>0</QuestionNums>
<Max>0</Max>
<Score>0</Score>
<Percent>0</Percent>
```

```xml
<ScoreBand>
   <Minimum>51</Minimum>
   <Maximum>100</Maximum>
   <Name>Topic Outcome 3—over 50</Name>
   <Message>Topic Outcome 3—over 50</Message>
</ScoreBand>
<ScoreBand>
   <Minimum>0</Minimum>
   <Maximum>50</Maximum>
   <Name>Topic Outcome 3—under 50</Name>
   <Message>Topic Outcome 3—under 50</Message>
</ScoreBand>
</ReportedTopic>
<ReportedTopic>
<Topic_ID>633548065</Topic_ID>
<Name>ReportedTopic1\ReportedTopic2</Name>
<Description />
<QuestionNums>0</QuestionNums>
<Max>0</Max>
<Score>0</Score>
<Percent>0</Percent>
<ScoreBand>
   <Minimum>51</Minimum>
   <Maximum>100</Maximum>
   <Name>Topic Outcome 2—over 50</Name>
   <Message>Topic Outcome&nbsp; 2—over 50</Message>
</ScoreBand>
<ScoreBand>
   <Minimum>0</Minimum>
   <Maximum>50</Maximum>
   <Name>Topic Outcome 2—under 50</Name>
   <Message>Topic Outcome&nbsp; 2—under 50</Message>
</ScoreBand>
</ReportedTopic>
<ReportedTopic>
<Topic_ID>1841060952</Topic_ID>
<Name>ReportedTopic1</Name>
<Description />
<QuestionNums>0</QuestionNums>
<Max>0</Max>
<Score>0</Score>
<Percent>0</Percent>
<ScoreBand>
   <Minimum>0</Minimum>
   <Maximum>50</Maximum>
   <Name>RT1 Override</Name>
   <Message />
</ScoreBand>
</ReportedTopic>
</ScoringAssessmentInstance>
```

5.1 D_Instance

The Delivery Assessment Instance is stored in the D_Instance table.

| Field Name | Description | Type |
| --- | --- | --- |
| Instance_ID | Unique identifier for this instance (not zero). | Long Integer |
| Random_Key | Randomization key used to generate instance | Text 50 |
| Session_MID | Top 8 numerals of Assessment ID S_Header.Session_MID | Long Integer |
| Session_LID | Bottom 8 numerals of Assessment ID S_Header.Session_LID | Long Integer |
| Revision | The current revision of the assessment used S_Header.Revision | Long Integer |
| Assessment_Type | The type of this assessment [0 = Quiz, 1 = Test, 2 = Survey, 3 = Exam]. S_Header.Assessment_Type | Integer |
| Name | The name of the assessment S_Header.Name | Text 200 |
| Description | The description of the assessment S_Header.Description | Text 1020 |
| Author | The person who created the assessment S_Header.Author | Text 200 |
| Last_Modified | The date the assessment was last modified S_Header.Modified_Date | Date/Time |
| Save_Answers | Whether to save the answers in the Answer tables S_Header.Save_Answers | Boolean |
| Save_Answer_Data | Whether to save data to all Answer tables or only results S_Header. Save_Answer_Data | Boolean |
| Number_Of_Questions | The number of questions in the assessment (must be counted when instance is created) | Long integer |
| Course | Name of course folder assessment was in S_Course.Name where S_Course.Course_ID matches S_Header.Course_ID | Text 200 |
| Session_Timed | Whether the assessment has a time limit S_Header. Session_Timed | Yes/No |
| Time_Limit | Time limit in minutes, 0 if no time limit S_Header.Time_Limit | Long integer |
| Expiry | When instance may be deleted - 0 \| 1 \| 2<br>0 - never deleted<br>1 - deleted after expiry date has passed<br>2 - delete after the instance has been scored once<br>Other values may be added in future. | Integer |
| Created_Date | The date this instance record was created | Date/Time |
| Expiry_Date | If Expiry = 1 this defines a date after which the instance may be deleted | Date/Time |
| Encoded | The encoding and/or encryption used on the Instance_Data<br>Default is 0 with no encryption, other values may be added in future. | Integer |

| Field Name | Description | Type |
| --- | --- | --- |
| Assessment_Data | Assessment instance for delivery (without scoring information) as XML data <AssessmentInstance> | Text 1 Gb |

From reading the present disclosure, other modifications will be apparent to persons skilled in the art. Such modifications may involve other features which are already known in the design, manufacture and use of assessment administration systems and software and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. The word "or" should be construed as an inclusive or, in other words as "and/or".

What is claimed is:

1. A method for administering an assessment, comprising:
   receiving an assessment request by a data processing device, the data processing device being associated with assessment information stored on a storage device, the assessment information including changeable versions of a plurality of assessment questions stored in a data store;
   creating an assessment instance including a version of at least a portion of the changeable versions of the plurality of assessment questions from the data store, wherein an assessment instance identifier (ID) identifies both the assessment instance and each specific version of the changeable versions of the plurality of assessment questions included in the assessment instance;
   recording the assessment instance ID that identifies both the assessment instance and the each specific version of the changeable versions of the plurality of assessment questions included in the assessment instance;
   sending, via a network, the assessment instance associated with the assessment instance ID to an assessment taker;
   amending, in the data store, at least one assessment question of the plurality of assessment questions included in the assessment instance identified by the assessment instance ID, wherein the at least one assessment question is amended in the data store after recording the assessment instance ID that identifies both the assessment instance and the each specific version of the changeable versions of the plurality of assessment questions included in the assessment instance and after sending the assessment instance associated with the assessment instance ID to the assessment taker, wherein the at least one assessment question, as amended after sending the assessment instance to the assessment taker, is absent from the assessment instance while the at least one assessment question, as unamended, remains on the assessment instance;
   recording assessment responses with the assessment instance ID to the plurality of assessment questions included in the assessment instance including the at least one assessment question amended in the data store after sending the assessment instance associated with the assessment instance ID to the assessment taker; and
   permitting analysis of the at least one assessment question, as unamended and remaining on the assessment instance, associated with the assessment instance ID after amending in the data store the at least one assessment question.

2. The method according to claim 1, wherein the assessment instance is presented to the assessment taker through an interface device configured to present the assessment instance to the user having a predetermined presentation mode, wherein the assessment instance, when presented, is adapted to be interpreted by a plurality of different interface devices having respective different presentation modes.

3. The method according to claim 2, wherein the assessment instance is communicated to the assessment taker in a format that is independent of presentation medium.

4. The method according to claim 1, wherein the assessment instance is delivered as speech and wherein the assessment responses are received as speech.

5. The method according to claim 1, wherein the assessment instance communicated to the assessment taker without scoring criteria.

6. The method according to claim 1, further comprising presenting the assessment instance to the assessment taker and a second assessment taker in accordance with first and second distinct delivery media, respectively.

7. The method according to claim 1, wherein the assessment instance is created by a randomized selection of at least a portion of the plurality of assessment questions.

8. The method according to claim 1, further comprising:
   receiving, by an application programming interface (API) of the data processing device, parameters associated with generating and transmitting the assessment instance responsive to an external program; and
   scoring, by the API, the assessment responses received from the external program.

9. The method according to claim 1, wherein at least the portion of the plurality of assessment questions are associated with a plurality of types, and wherein the assessment instance is created by choosing random assessment questions of the portion, constrained by at least one type of the plurality of types, wherein the at least one type is adapted to a delivery medium configured to deliver the assessment instance to the assessment taker.

10. The method according to claim 1, wherein the assessment instance is communicated through a communication medium in eXtensible Markup Language (XML) format.

11. The method according to claim 1, wherein the assessment instance is created by selecting at least the portion of the plurality of assessment questions grouped by topic.

12. The method according to claim 1, further comprising delivering the assessment results to a user.

13. The method according to claim 1, wherein the assessment instance is defined based at least in part on a set of assessment parameters and the assessment information.

14. A data processing device for administering an assessment, comprising:
at least one storage device configured to store assessment information, the assessment information including changeable versions of a plurality of assessment questions stored in a data store;
at least one interface configured to:
receive a request for an assessment instance;
transmit at least one assessment instance responsive to the request, the at least one assessment instance including a version of at least a portion of the changeable versions of the plurality of assessment questions from the data store, wherein an assessment instance identifier (ID) identifies both the assessment instance and each specific version of the changeable versions of the plurality of assessment questions included in the assessment instance;
record the assessment instance ID that identifies both the assessment instance and the each specific version of the changeable versions of the plurality of assessment questions included in the assessment instance;
send, via a network, the assessment instance associated with the assessment instance ID to an assessment taker;
amend, in the data store, at least one assessment question of the plurality of assessment questions included in the assessment instance identified by the assessment instance ID, wherein the at least one assessment question is amended in the data store after recording the assessment instance ID that identifies both the assessment instance and the each specific version of the changeable versions of the plurality of assessment questions included in the assessment instance and after sending the assessment instance associated with the assessment instance ID to the assessment taker, wherein the at least one assessment question, as amended after sending the assessment instance to the assessment taker, is absent from the assessment instance while the at least one assessment question, as unamended, remains on the assessment instance;
record assessment responses with the assessment instance ID to the plurality of assessment questions included in the assessment instance including the at least one assessment question amended in the data store after sending the assessment instance associated with the assessment instance ID to the assessment taker; and
permit analysis of the at least one assessment question, as unamended and remaining on the assessment instance, associated with the assessment instance ID after amending in the data store the at least one assessment question.

15. The device according to claim 14, wherein the assessment instance is transmitted to the assessment taker in a format that is independent of presentation medium and is adapted to be presented to the assessment taker through a plurality of interface devices including respectively different presentation media.

16. The device according to claim 14, wherein the assessment instance is adapted to be delivered to an assessment taker through a speech interface and wherein the assessment responses are adapted to be received as speech.

17. The device according to claim 14, wherein the data processing device is configured to generate the assessment instance by a randomized selection of at least the portion of the plurality of assessment questions.

18. The device according to claim 14, wherein the at least one interface is further configured to respond to communications in accordance with an application programming interface (API) to at least receive parameters associated with a generation and transmission of the assessment instance, and further configured to score the assessment responses.

19. The device according to claim 14, wherein the assessment instance is created by selecting at least the portion of the plurality of assessment questions grouped by topic.

20. The device according to claim 14, wherein the at least one interface is further configured to communicate the assessment instance through a communication medium in eXtensible Markup Language (XML) format.

21. The device according to claim 14, further comprising a processor configured to define the assessment instance based on a set of assessment parameters and the assessment information on the storage device.

22. A tangible computer readable medium having a plurality of instructions stored thereon which, when executed across one or more processors, causes at least a portion of the one or more processors to perform operations to administer an assessment, comprising:
receiving an assessment request by a data processing device, the data processing device being associated with assessment information stored on a storage device, the assessment information including changeable versions of a plurality of assessment questions stored in a data store;
creating an assessment instance including a version of at least a portion of the changeable versions of the plurality of assessment questions from the data store, wherein an assessment instance identifier (ID) identifies both the assessment instance and each specific version of the changeable versions of the plurality of assessment questions included in the assessment instance;
recording the assessment instance ID that identifies both the assessment instance and the each specific version of the changeable versions of the plurality of assessment questions included in the assessment instance;
sending, via a network, the assessment instance associated with the assessment instance ID to an assessment taker;
amending, in the data store, at least one assessment question of the plurality of assessment questions included in the assessment instance identified by the assessment instance ID, wherein the at least one assessment question is amended in the data store after recording the assessment instance ID that identifies both the assessment instance and the each specific version of the changeable versions of the plurality of assessment questions included in the assessment instance and after sending the assessment instance associated with the assessment instance ID to the assessment taker, wherein the at least one assessment question, as amended after sending the assessment instance to the assessment taker, is absent from the assessment instance while the at least one assessment question, as unamended, remains on the assessment instance;
recording assessment responses with the assessment instance ID to the plurality of assessment questions included in the assessment instance including the at least one assessment question amended in the data store after sending the assessment instance associated with the assessment instance ID to the assessment taker; and
permitting analysis of the at least one assessment question, as unamended and remaining on the assessment instance, associated with the assessment instance ID after amending in the data store the at least one assessment question.

23. The method according to claim 1, wherein permitting analysis of the at least one assessment question, as unamended and remaining on the assessment, associated with the assessment instance ID after amending in the data store the at least one assessment question is based upon, at least in part, scoring the assessment using a captured version of scoring criteria associated with the assessment instance ID that identifies both the assessment instance and each specific version of the changeable versions of the plurality of assessment questions included in the assessment instance.

\* \* \* \* \*